United States Patent
Qadri et al.

(10) Patent No.: US 10,402,301 B2
(45) Date of Patent: Sep. 3, 2019

(54) CLOUD VALIDATION AS A SERVICE

(71) Applicant: Microsoft Technology Licensing, LLC, Redmond, WA (US)

(72) Inventors: Faraz Qadri, Redmond, WA (US); Aniket Malatpure, Redmond, WA (US); John Haskin, Bellevue, WA (US); Tanmay Waghmare, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/865,235

(22) Filed: Jan. 8, 2018

(65) Prior Publication Data

US 2019/0213104 A1    Jul. 11, 2019

(51) Int. Cl.
*G06F 11/36* (2006.01)
*H04L 29/06* (2006.01)

(52) U.S. Cl.
CPC ...... *G06F 11/3608* (2013.01); *G06F 11/3688* (2013.01); *H04L 63/0823* (2013.01)

(58) Field of Classification Search
CPC ....... G06F 17/30321; G06F 9/50; H04L 67/10
USPC ....................................................... 717/126
See application file for complete search history.

(56) References Cited

U.S. PATENT DOCUMENTS

| | | | |
|---|---|---|---|
| 9,825,819 B2 | 11/2017 | Curcic et al. | |
| 9,838,431 B2 | 12/2017 | Nagaratnam et al. | |
| 9,843,560 B2 | 12/2017 | Hwang et al. | |
| 9,843,605 B1 | 12/2017 | Hamilton, II et al. | |
| 2014/0026122 A1* | 1/2014 | Markande | G06F 11/3664 717/124 |
| 2014/0156630 A1* | 6/2014 | Yin | G06F 17/30867 707/710 |
| 2014/0229620 A1 | 8/2014 | Horman et al. | |
| 2016/0085861 A1 | 3/2016 | Vecera et al. | |

(Continued)

OTHER PUBLICATIONS

Malatpure, et al., "Experience Report: Testing private cloud reliability using a public cloud validation SaaS", International Symposium on Software Reliability Engineering, Jun. 20, 2017, 1 page.

(Continued)

*Primary Examiner* — John Q Chavis
(74) *Attorney, Agent, or Firm* — Ogilvie Law Firm

(57) ABSTRACT

Described technologies facilitate cloud validation using validation as a service (VaaS). A cloud validation service provider acquires and securely stores certification tests developed by cloud component providers, integrated solution providers, and others. Each test's executable portion tests hardware or software of a candidate cloud. The candidate may be on the premises of an enterprise, or instead be a hosted cloud on the premises of a hoster off the premises of the entity that pays for the hosting. Monitored testing is done using an infrastructure in the candidate cloud or in a public cloud. Results are uploaded to the VaaS provider, which provides an analysis of test results for use in determining whether to validate the candidate cloud. Test execution agents may be VaaS-cloud-resident or candidate-cloud-resident, and may use a mutex to prevent simultaneous execution of tests. Testing may be accomplished even when the candidate cloud has no internet-exposed communication endpoint.

20 Claims, 10 Drawing Sheets

(56) References Cited

U.S. PATENT DOCUMENTS

| | | |
|---|---|---|
| 2016/0212099 A1 | 7/2016 | Zou et al. |
| 2016/0226663 A1* | 8/2016 | Jones ................ H04L 9/14 |
| 2017/0180372 A1* | 6/2017 | Bezold ................ G06F 21/6209 |
| 2018/0131514 A1* | 5/2018 | Jones ................ H04L 9/14 |

OTHER PUBLICATIONS

"Build Services | Mirantis", retrieved from <<https://www.mirantis.com/services/build-services/>>, no later than Dec. 20, 2017, 4 pages.

"Cloud computing", retrieved from <<https://en.wikipedia.org/wiki/Cloud_computing>>, Dec. 19, 2017, 19 pages.

Gadeweev, "Azure Stack Validation as a Service (VaaS) on Premise Agent", retrieved from <<https://github.com/Azure/azurestack-solutionvalidation/wiki/Azure-Stack-Validation-as-a-Service-(VaaS)-On-Premise-Agent>>, Oct. 6, 2017, 3 pages.

"Test for performance and compatibility", retrieved from <<https://docs.microsoft.com/en-us/windows-hardware/test/index>>, no later than Dec. 20, 2017, 3 pages.

AnikM (Aniket Malatpure), "Cloud Simulation Engine", retrieved from <<https://github.com/Azure/azurestack-solutionvalidation/wiki/Cloud-Simulation-Engine>>, Nov. 30, 2017, 2 pages.

Farazq (Faraz Qadri), "Azure Stack Validation as a Service (VaaS) Fault Engine Execution", retrieved from <<https://github.com/Azure/azurestack-solutionvalidation/wiki/Azure-Stack-Validation-as-a-Service-%28VaaS%29-Fault-Engine-Execution>>, Aug. 9, 2017, 9 pages.

"Software Testing for Professionals | Visual Studio", retrieved from <<https://www.visualstudio.com/vs/test-professional/>>, no later than Dec. 23, 2017, 8 pages.

"VMWare Cloud Provider Program", retrieved from <<https://www.vmware.com/partners/service-provider.html>>, no later than Dec. 20, 2017, 7 pages.

"VMware Validated Designs for Software-Defined Data Center", retrieved from <<https://www.vmware.com/solutions/software-defined-datacenter/validated-designs.html>>, no later than Dec. 21, 2017, 5 pages.

* cited by examiner

CLOUD VALIDATION AS A SERVICE

BACKGROUND

In a technical context that involves computing, networking, storage, and services, the term "cloud" may be defined in various ways. However, definitions generally recognize a cloud as having multiple key characteristics, such as some combination of two or more of virtualization, resource pooling, scalability and elasticity through on-demand provisioning of resources, multitenancy, device independence, location independence, web accessibility, internet accessibility, and centralized administration. The National Institute of Standards and Technology's definition of cloud computing identifies five essential characteristics, namely, On-demand self-service, Broad network access, Resource pooling, Rapid elasticity, and Measured service.

Individual clouds may be distinguished from one another based on authentication requirements and other security measures at the edge of a given cloud, based on legal title, based on service level agreement definitions, based on control of underlying hardware or system software by different entities, and in other ways. Some clouds are open to the public, or at least to any paying subscriber. Other clouds are "private" in the sense that legitimate access to them is restricted to a single entity or a specified small group of related entities, by technical and legal mechanisms.

In addition to the characteristics that make a given collection of resources qualify as a cloud, and that delineate it as a particular cloud which is distinguishable by one skilled in the art from other clouds, a particular cloud may have operational or performance characteristics that relate to corresponding operational or performance goals or requirements. "Validation" of a cloud involves testing the cloud to assess compliance with operational or performance goals or requirements. Cloud validation poses technical challenges. Improvements in the efficiency, thoroughness, cost-effectiveness, flexibility, reliability, and availability of cloud validation capabilities would be advantageous.

SUMMARY

Some technologies described herein are directed to the technical activity of facilitating cloud validation. Descriptions are provided herein from different perspectives, because cloud validation may be viewed from different perspectives. Some of the roles that may be involved in particular cloud validation service include a validation service provider, a candidate cloud to be validated, a cloud component provider, an integrated solution provider, a candidate cloud operator, a cloud certification test provider, a cloud certification test execution agent, a cloud hoster, an enterprise which owns or utilizes a candidate cloud, and others. Not every role is necessarily present in a given embodiment. Those of skill in the cloud validation art will understand, when a technology description is given herein from one or more perspectives, how that described technology would appear from another perspective, regardless of whether the other perspective's view is also expressly recited herein.

In some embodiments, which may be performed by or on behalf of a cloud validation service provider, one or more validation servers outside a candidate cloud acquire, and store in a secured location, at least one digital certification test. The test(s) may be acquired from the validation service provider in some cases, and in some cases tests are acquired from at least one source other than the validation service provider. Each digital certification test has an executable portion which is capable, upon execution, of testing hardware that resides in the candidate cloud or testing software that resides in the candidate cloud, or testing both hardware and software of the candidate cloud. The embodiment supplies a certification test execution infrastructure which is capable of executing one or more certification test executable portions, with the execution occurring in the candidate cloud or elsewhere, depending upon the infrastructure used. The embodiment also monitors at least one execution of at least one certification test executable portion, receives at least one certification test result which was generated by execution of one or more certification test executable portions, and provides one or more certification test results for use by one or more parties in making a determination whether to validate the candidate cloud.

Some embodiments that support validation testing of a candidate cloud include a validation service interface which is hosted on a public cloud outside the candidate cloud. In some, the validation service interface includes a test upload interface for uploading certification tests. Embodiments may also include at least one of the following certification test execution infrastructures: (i) a cloud-resident test execution agent and a testing environment configured to run the cloud-resident test execution agent, the testing environment at least partially hosted in the public cloud, or (ii) a downloadable test execution agent configurable to run in the candidate cloud. Embodiments may also include a validation engine server which includes at least one processor and a memory, the memory containing and configured by software which upon execution (a) coordinates performance of certification tests using at least one test execution agent, (b) receives certification test results generated by said performance, and (c) provides an analysis of the certification test results.

In some embodiments, which may be performed by or on behalf of a cloud validation service operator, the operator authenticates to a validation service interface, downloads via the validation service interface a test execution agent, and gives the test execution agent access to run in the candidate cloud. Then the operator obtains (via the validation service interface) a result of a certification test after the test execution agent runs in the candidate cloud and executes at least a portion of the certification test in the candidate cloud. Results are obtained after the test execution agent runs enough to produce test results, which is not necessarily to completion. The cloud validation service operator may be an integrated solution provider, or a candidate cloud operator, for example.

In some embodiments, including some of those noted above, tests are executed by a test execution agent in a candidate cloud, and the agent makes only outbound connections. Such embodiments facilitate validation without reliance on having endpoints of the candidate cloud be exposed over the internet. In some cases exposed endpoints are present but are not used by the agent, and in other cases no exposed endpoints are present.

In some embodiments, including some of those noted above, a distributed mutex is implemented to prevent simultaneous execution of different certification tests.

Other technical activities pertinent to teachings herein will also become apparent to those of skill in the art.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
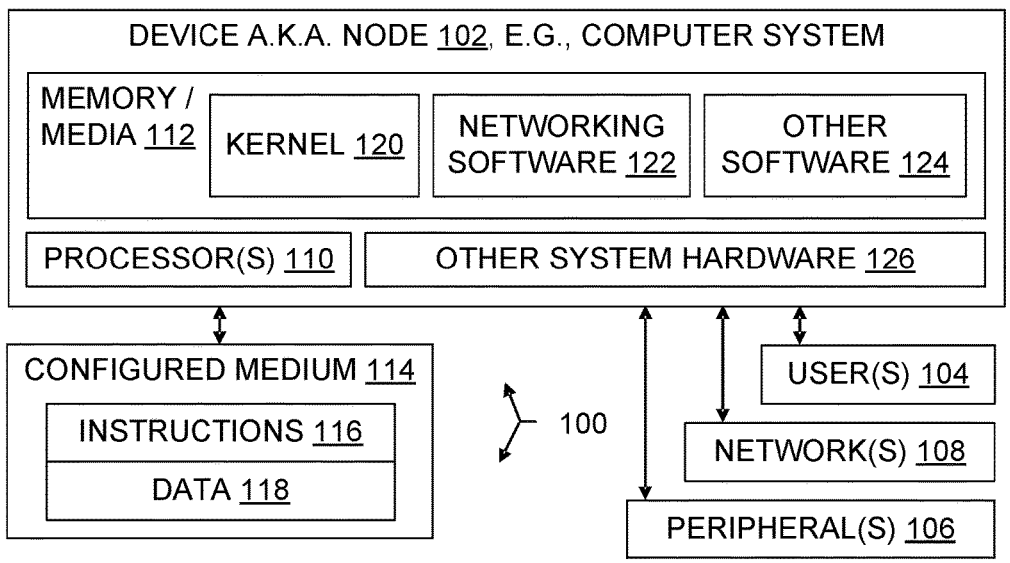
FIG. 1 is a block diagram illustrating aspects of a computer system having at least one processor, at least one kernel such as an operating system, networking software, and at least one memory, which interact with one another, and also illustrating a configured storage medium.

Previous approaches typically require parties who are validating a cloud to manually locate and then download tools and tests, to run them, and then manually upload the results for analysis. Manual approaches are susceptible to omission of pertinent tests, configuration errors which impact test execution or test results, and delays and expense involved in allocating administrative personnel to cloud testing. Approaches described herein provide technical features which can automate the delivery of new tools and tests once deployed, and automate the uploading of test results.

Consider an example. Suppose Contoso OEM (a fictional company) wants to sell their integrated solution to customers, e.g., to candidate cloud operators. The solution is built using components from cloud component providers. For the software component they use Microsoft's Azure® Stack cloud software (mark of Microsoft Corporation). For hardware they can either use their own or hardware from other IHV's or both. Contoso OEM has contracted with Microsoft to get their integrated solution certified before bringing it out to the market. They understand that certifying their solution will ensure that the hosted cloud services offered by Microsoft will run reliably and functionally correct on their hardware stack. Microsoft will then provide them a license for Cloud Validation as a Service (VaaS) which will be used for certification, using technology described herein. Contoso can then access the validation service to start the integrated solution certification workflow, download their test execution agent and execute the workflow. As a part of workflow execution, the test execution agent will download certification tests on-premises, execute them against their solution, validate and upload the test results. Once completed they request certification sign off from Microsoft. The certified integrated solution is then brought to the market.

As another example, suppose DatumBeast (a fictional company) is a service provider which offers IaaS and PaaS offerings to its customers. They purchase the certified integrated solution from Contoso; to provide more services to end users they also host services from a third party as well. Before making these services available to their customers they want to ensure that they run functionally correct. DatumBeast applies for a license on using a cloud validation service. They then execute the cloud service validation workflow which validates the service being deployed. The validation tests execute from a public cloud against their candidate cloud endpoints. DatumBeast doesn't have to install or configure anything software on-premises. Once test execution results have succeeded they are sure that the service works as expected and is safe to offer to their customers.

More generally, many organizations operate today in a hybrid environment, with some resources running in an on-premises environment and others located in one or more cloud environments, which may include on-premises clouds, hosted private clouds off premises, and public cloud installations. Some organizations operate in a private and public cross-cloud environment, or in another mixture of public, third-party, and proprietary computing environments. Large organizations may have dozens or hundreds of isolated networks, due to management decisions. For example, different software development teams might have their own respective private subscriptions to services such as those provided by Microsoft Azure®, Amazon AWS®, Google®, Rackspace®, or another provider (Azure is a mark of Microsoft Corporation, AWS is a mark of Amazon Technologies, Inc., Google is a mark of Google, Inc., and Rackspace is a mark of Rackspace US, Inc.). In such a situation, if one team is consuming a networked service provided by another team in the organization, then communications implementing that service consumption may be sent over the internet, and thus be exposed to security risks that are present in internet communication.

A challenge for an organization that provides customized clouds is how best to validate the cloud to the organization's customers. A related challenge is how an entity can validate a private cloud that has no communication endpoints exposed to the internet. Teachings disclosed herein inform solutions to address those challenges and other problems discussed herein.

Some embodiments described herein may be viewed in a broader context. For instance, concepts such as authentication, mutual exclusion, private clouds, validation, and testing may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving authentication, mutual exclusion, private clouds, validation, or testing are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. Some embodiments address technical activities that are rooted in networking technology. Some include technical components such as computing hardware which interacts (as described herein) with software in a manner beyond the typical interactions within a general purpose computer. Technical effects provided by some embodiments include improvements in the efficiency, thoroughness, cost-effectiveness, flexibility, reliability, and availability of cloud validation capabilities. Other advantages based on the technical characteristics of the teachings will also be apparent to one of skill from the description provided.

Acronyms and Abbreviations

Some acronyms and abbreviations are defined below. Others are defined elsewhere herein or require no definition to be understood by one of skill.

AD: Active Directory® (mark of Microsoft Corporation)
ADAL: Active Directory authentication library
ADFS: Active Directory federation services
ALU: arithmetic and logic unit
API: application program interface
APP: application
ARM: Azure® resource manager (mark of Microsoft Corporation)
BCDR: business continuity and disaster recovery
BI: business intelligence (cf. Power BI® mark of Microsoft Corporation)
BIOS: basic input/output system
BOM: bill of materials
CD: compact disc
CPU: central processing unit
CSI: cloud server infrastructure
DNS: domain name system
DVD: digital versatile disk or digital video disc
DVM: deployment virtual machine
ETW: event tracing for Windows® (mark of Microsoft Corporation)
FPGA: field-programmable gate array
FPU: floating point processing unit
FRU: field replaceable unit
GPU: graphical processing unit
GUI: graphical user interface
HLK: hardware lab kit
HRP: health resource provider
IDE: integrated development environment, sometimes also called "interactive development environment"
IDP: identity provider
IHV: independent hardware vendor
IP: internet protocol
ISP: internet service provider
ISV: independent software vendor
JSON: JavaScript® object notation (mark of Oracle America Inc.)
KB: knowledge base
KPI: key performance indicator
LAN: local area network
MAC: media access control
MAS: Microsoft Azure® Stack (mark of Microsoft Corporation)
MSDN: Microsoft Developer Network
MSI: Microsoft software installer, a.k.a. Windows installer
MSP: managed service provider
NIC: network interface card
OEM: original equipment manufacturer
OS: operating system
PCS: private cloud simulator
PoC: proof of concept
PPE: pre-production environment
RAM: random access memory
RBAC: role-based access control
REST: representational state transfer
ROM: read only memory
SaaS or SAAS: software as a service
SAS: shared access signature
SLA: service level agreement
SI: system integrator
SQL: structured query language
TAEF: test authoring and execution framework
URI: uniform resource identifier
URL: uniform resource locator
VaaS or VAAS: validation as a service
VM: virtual machine
VPN: virtual private network
VSO: Visual Studio® online (mark of Microsoft Corporation)

Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

A "node" is an item with processing capability, access to at least one network, and a network address. Networked computer systems are examples of nodes. However, a networked computer system may include one or more nodes. For example, two server processes running on the same machine may each have control of a different respective NIC at a different respective network IP address, and thus operate as two different nodes. Similarly, two processes may share the same NIC hardware and the same IP address but operate from different ports as distinct nodes.

"Kernels" include operating systems, hypervisors, virtual machine platforms, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"Service" means a consumable program offering in a cloud computing environment or other network environment.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. This is understood by persons of skill in the art, but others may sometimes need to be informed or reminded of the facts.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

An "on-premises network" is a network on the premises of a particular entity. Its hardware (at least) is owned or managed by that entity, although it may host the network for the benefit of another entity which does not control the premises. A "cloud network" is a network accessible through the internet which is owned by a cloud service provider and which provides compute, storage, and network capabilities to multiple entities.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, acquiring, authenticating, configuring, coordinating, determining, discovering, downloading, executing, exposing, furnishing, generating, giving, hosting, implementing, initiating, locating, monitoring, obtaining, performing, providing, receiving, relying, residing, responding, running, securing, sending, setting up, specifying, storing, supplying, uploading, utilizing, validating (and accesses, accessed, acquires, acquired, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment
- 102 computer system, also referred to as computational system or computing system
- 104 users
- 106 peripherals
- 108 network generally
- 110 processor
- 112 computer-readable storage medium, e.g., RAM, hard disks
- 114 removable configured computer-readable storage medium
- 116 instructions executable with processor; may be on removable media or in other memory (volatile or non-volatile or both)
- 118 data
- 120 kernel(s), e.g., operating system(s), BIOS, device drivers, hypervisors
- 122 networking software generally
- 124 other software, e.g., applications, anti-virus software
- 126 computing hardware not otherwise associated with a reference number such as 106, 108, 110, 112, or 114
- 200 operating environment of clouds
- 202 public cloud
- 204 private cloud
- 206 enterprise premises
- 208 hoster premises
- 302 cloud validation service operator
- 304 cloud operator
- 306 enterprise
- 308 hoster
- 310 integrated solution provider
- 312 cloud manager
- 314 validation server cloud (generally a public cloud 202)
- 316 cloud testing environment, e.g., cloud test execution infrastructure hosted in cloud
- 318 cloud validation service interface, e.g., validation service client interfaces for accessing validation service using a client interface such as Web API, REST API calls, or another interface
- 320 cloud validation service store, e.g., one or more validation service management stores which manage content such as test packages, test items, or other content, and may include public content
- 322 results of cloud certification tests (as to validation versus certification, multiple certifications are typically part of a validation)
- 324 summary or other analysis of cloud certification test results
- 326 validation service APIs; these may include, e.g., REST APIs to which validation client interface implementations talk to drive their validation workflows; a given implementation may include one or more certification test upload interfaces; in some embodiments, validation service operators use one or more validation service client interfaces to perform work and these interfaces' implementations send API calls to the validation service API to drive for an actual result; in some implementations the validation service APIs driver or include a cloud validation engine
- 328 validation service multi-tenant store; this store persists tenant-related data such as test logs, test results, resources, and so on; in some implementations, this store is partitioned so each tenant has a unique partition
- 330 servers
- 332 secure access token
- 334 secure access token service
- 336 validation service provider
- 338 cloud certification test
- 340 executable portion of cloud certification test
- 342 non-executable portion of cloud certification test
- 344 certification test execution agent (software), e.g., downloadable on-premises agent 358
- 346 distributed mutex
- 348 cloud tests which are not required as part of validation
- 350 candidate cloud, namely, cloud which is a candidate for validation based on one or more certification test results; this is generally a private cloud
- 352 cloud components (hardware or software or both)
- 354 cloud communication endpoints, namely, ports or portals or sockets or APIs or other mechanisms which permit communication of state or other data into the cloud, or out of the cloud, or both
- 356 cloud component provider
- 358 on-premises agent (downloadable for test execution)
- 400 validation service provider method
- 402 acquire certification test
- 404 store certification test
- 406 supply certification test execution infrastructure
- 408 supply certification test execution infrastructure which is at least partially resident in validation service cloud
- 410 supply certification test execution infrastructure which is at least partially resident in candidate cloud
- 412 monitor execution of certification test
- 414 receive results 322 of execution certification test
- 416 provide party (typically other than validation service) with results 322 of execution certification test
- 418 determine validation status
- 420 validation status, e.g., all tests passed (cloud validated), particular tests passed, particular tests pending, particular tests failed, particular tests underway
- 422 certification test execution infrastructure
- 500 candidate cloud manager method
- 501 register with cloud validation service provider
- 502 authenticate candidate cloud manager to cloud validation service
- 504 download test execution agent 506 give test execution agent permissions, resources (compute, network, storage), location information and other items necessary for agent to execute test(s)
508 agent runs and executes the executable portion of test(s)
510 cloud manager obtains test results, e.g., by downloading them from validation service
600 flowchart; steps may be combined with steps of FIGS. 4, 5, 7, 8
602 get test from other than VAAS provider (special case of step 402)
604 get test from VAAS provider (special case of step 402)
606 use infrastructure 422 outside the candidate cloud, e.g., inside the validation service provider's cloud
608 use infrastructure 422 inside the candidate cloud
610 send request to exposed endpoint 354 of candidate cloud
612 request
614 avoid using exposed endpoint 354 of candidate cloud; regardless of whether such an endpoint exists, use is avoided
616 work to perform certification testing when candidate cloud has no exposed endpoint 354
618 make only outbound connections (at least as far as cloud validation is concerned) from within the candidate cloud
620 outbound connections
622 acquire a test 348 that is not required for validation (special case of step 402)
624 perform multiple steps fully automatically without human intervention required by conventional approaches
626 respond to requests from candidate cloud
628 avoid initiating traffic into the candidate cloud
630 avoid exposing any communication endpoint on the internet (publicly, that is)
632 host or otherwise provide a cloud validation service, at elast partially on a public cloud
634 upload a certification test to a cloud validation service (a.k.a. VaaS provider)
636 coordinate performance (execution) of certification tests, e.g., by scheduling test tasks, or using mutex, or both
638 recover test agent—run again after fault
640 fault which kills or hangs test agent, e.g, failure of a virtual machine that is running the test agent
702 download certification test (most recent version unless otherwise indicated)
704 obtain secure access token 332
706 utilize secure access token 332
708 implement (e.g., create or use or both) distributed mutex 346
710 make analytics page available to VaaS user
712 certification test result analytics page
714 run all certification tests in VaaS cloud
716 host an enterprise candidate cloud off the enterprise's premises
718 operate an enterprise candidate cloud on the enterprise's premises
720 avoid downloading any package to an enterprise or other entity's premises in order to perform testing of the entity's candidate cloud
722 software package
724 avoid setting up cloud testing infrastructure on an entity's premises when testing the entity's candidate cloud (may set up in VaaS cloud instead)
726 set up cloud testing infrastructure
800 VaaS user experience, e.g., interface experienced by user of VaaS
802 portal
804 PowerShell® or other shell or command line interpreter, or code running therein
806 .NET™ code or other development framework code
808 VaaS software development kit
810 VaaS processor
812 VaaS processor front end
814 VaaS processor back end
902 certification test repository
904 VaaS log
906 log repository
1002 identity provider
1004 web application
1006 solution hierarchy
1008 management API
1010 queues generally
1012 certification test launcher
1014 on-premises cloud stack API
1102 controller
1104 worker(s)
1106 task database
1302 certification test developer
1304 tester, e.g., cloud operator or integrated solution provider
1306 store API
1308 test handler
1310 tenant API
1312 storage tables
1314 test execution plugin
1316 runtime
1318 working directory
1320 virtual machine used in test processing
1322 tenant Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, software developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 126 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays, an operating environment may also include other hardware 126, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Network Environments

Figure 2:
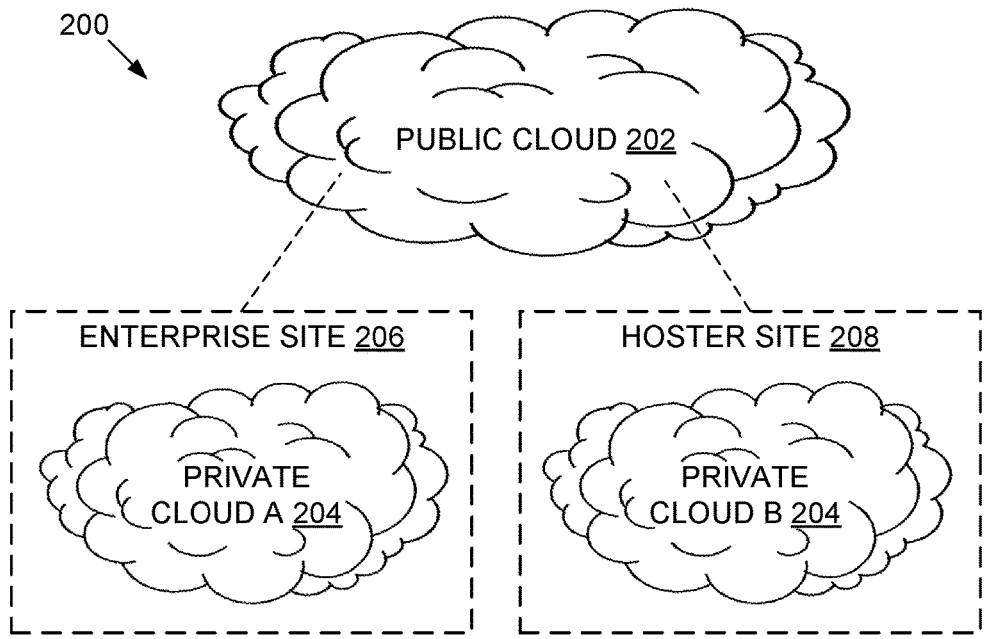
FIG. 2 is a diagram illustrating aspects of environments which include one or more clouds.

With reference to FIG. 2, an operating environment 100 may overlap or reside in one or more cloud or other network environments 200. One of skill will recognize and distinguish between a public cloud 202 and a private cloud 204, based for example on who owns or manages the underlying hardware, or on access restrictions. As illustrated, a private cloud 204 that is owned or controlled by or on behalf of an entity (such as a large business, agency, institution, or other "enterprise") may reside at a physical location 206 that is also owned or controlled by the enterprise. Alternately, or in addition, an enterprise may use or benefit from a private cloud 204 that is hosted by a hoster at a location 208 off of the enterprise's premises. Various hybrids of on-premises private clouds, off-premises hosted private clouds, and public cloud resources may be utilized together by an enterprise in a given embodiment or operating environment.

Some Cloud Validation Roles and Items

Figure 3:
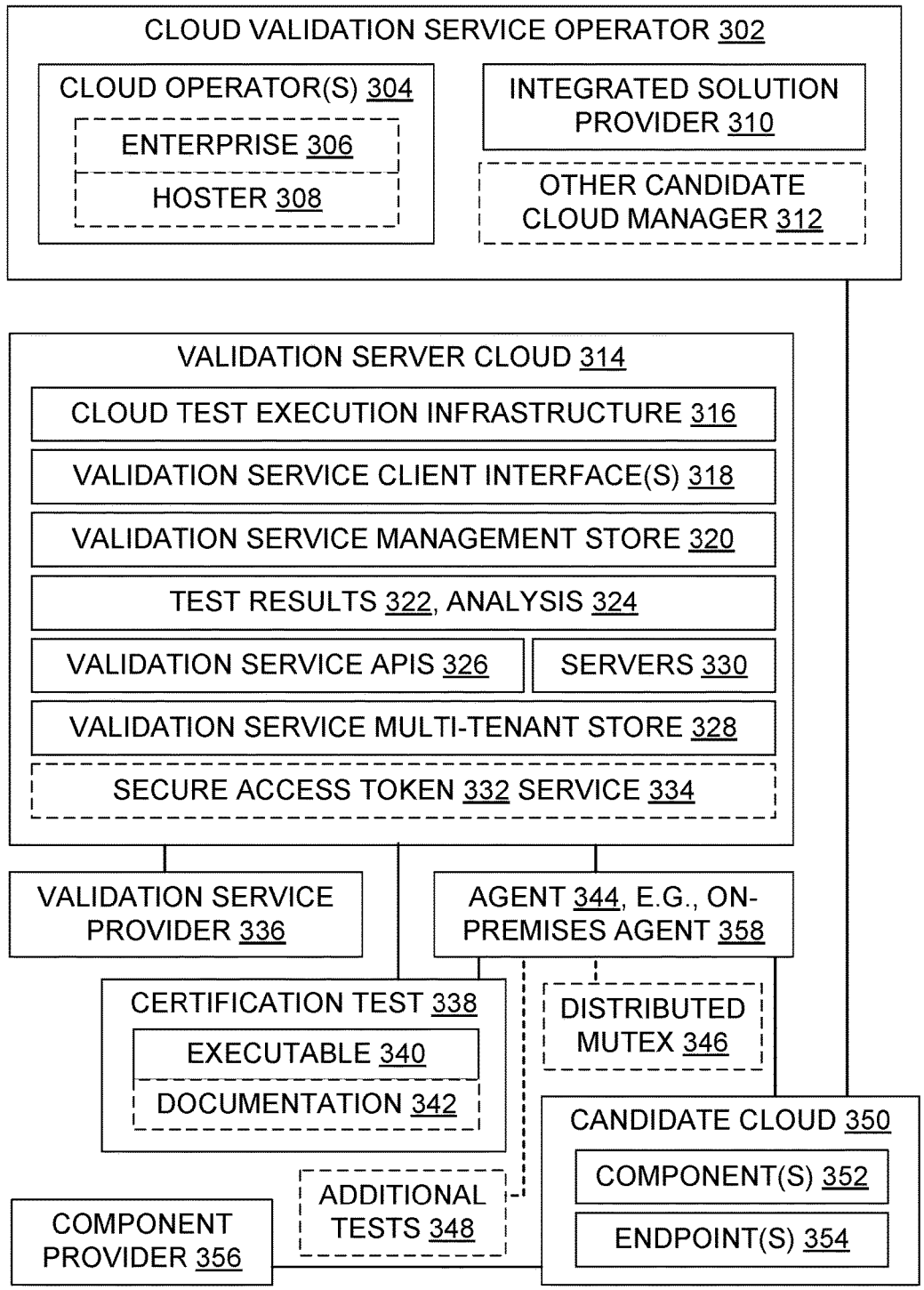
FIG. 3 is a block diagram illustrating aspects of cloud validation which include various roles as well as certification tests and other items.

As illustrated in FIG. 3 and other portions of the present disclosure, a cloud validation service may use or include various roles and various items. The illustrated configuration includes a candidate cloud 350 which contains software and hardware components 352 provided by cloud component providers 356. Component providers 356 generally include hardware providers (e.g., network, server, storage vendors) and software providers (e.g., kernel, cloud stack, application, development, and other software vendors).

The illustrated candidate cloud 350 also has communication endpoints 354. The endpoints may be publicly visible, e.g., accessible over the internet, or not, depending on the particular configuration.

The candidate cloud 350 is typically a private cloud 204, although teachings herein may also be applied to aspects of public clouds.

The candidate cloud 350 is the cloud that will be validated and certified using certification tests 338 before being deployed to an on-premises datacenter or other location, assuming sufficient tests 338 are passed to allow deployment. Certification tests 338 are executed to measure reliability, performance, availability, throughput, security, scalability, resiliency, administrability, load balancing, and other cloud characteristics. Each certification test 338 includes an executable portion 340, and may include non-executable portions 342 such as documentation, logs, authentication certificates, or metadata. Certification tests 338 may be uploaded to a VaaS store through an interface 326. Additional tests 348 not required for validation may also be executed.

Using one or more test execution agents 344, certification tests can be executed either on a validation server cloud 314 or on-premises at an enterprise site 206 or hoster site 208. Execution of tests 338 may be coordinated using a distributed mutex 346 or other mechanism to prevent test executions from overlapping one another or interfering with one another. Tests 338 may be executed at least in part in a testing environment such as a cloud test execution infrastructure 316 of the validation server cloud 314 when the candidate cloud endpoints 354 are exposed over the internet. Tests 338 may be executed primarily or solely in the candidate cloud 350 when the cloud endpoints are accessible only from on-premises. This may be the case with clouds managed by integrated solution providers 310. Each test execution agent is responsible for executing the tests 338, persisting state and uploading test results 322 at the end of execution. In the illustrated configuration, each on-premises test execution agent 358 automatically downloads the certification test packages from a validation service management store 320 and executes them against the candidate cloud.

Once deployed, the validated cloud can be used in various scenarios. For instance, the validated cloud may be used by one or more enterprises 306 as a private cloud or as part of a hybrid cloud that is made accessible only through the enterprise's network 108. Alternately, the validated cloud may be used by service providers such as hosters 308 which deploy cloud services and offer them to external customers (called "tenants") for IaaS, PaaS, or SaaS offerings.

One or more cloud operators 304 or integrated solution providers 310 or other cloud managers 312 manages the candidate cloud. In a cloud validation process, such personnel or entities also fill a cloud validation service operator 302 role. For a private cloud located on-premises at an enterprise, the candidate cloud operator would often be the enterprise 306. For a cloud hosted at a datacenter and exposed to external customers the candidate cloud manager would often be the datacenter service provider, e.g., a hoster 308. Integrated solution providers 310 include OEMs that use components from cloud component providers 356 and integrate them on their hardware. These integrated solutions are then brought to market and sold to candidate cloud operators 304.

A cloud validation service operator 302 role manages validation service tasks. The cloud validation service operator 302 interacts with validation services provided by a validation service provider 336, e.g., by using a validation service interface 318 such as a validation service client interface to execute certification tests. The cloud validation service operator 302 may be an integrated solution provider 310 that validates and certifies that the integrated solution can run the cloud 350 while meeting tenant SLAs before bringing them to the market, for example. Candidate cloud operators 304 also use VaaS to validate new cloud 350 services offered to customers, to make certain the services work as expected when deployed on the integrated solution.

The validation service provider 336 role implements the business and technical processes that allow cloud validation service operators 302 to certify various components 352 of the candidate cloud 350. Users access this service via a web portal or other interface 318 which presents these processes as workflows. Each workflow guides the user 104, 302 to facilitate testing and (one hopes) ultimately certifying a specific component of the candidate cloud. The workflow interface 318 may present the requirements for certification, show lists of tests that need to get executed, and offer continuous test execution monitoring as tests are executed. A summary, dashboard, or other analysis 324 of test results may also be available through the VaaS interface 318.

In addition to capabilities noted above, a VaaS cloud 314 may include a validation engine within or supporting validation service APIs 326 which coordinates testing 338 within the VaaS cloud, and servers 330 which perform user interface, testing, or other VaaS services. Access to VaaS services may be secured, e.g., by an access control service such as a SAS service 334 utilizing secure access tokens 332.

Systems

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

Some embodiments use or provide a system supporting validation testing of a candidate cloud. An example system includes a validation service client interface 318 hosted 632 on a public cloud 202 outside the candidate cloud 350. The validation service interface includes a test upload interface 326 for uploading certification tests. The example system also includes at least one of the following certification test execution infrastructures 422: (i) a cloud-resident test execution agent 344 and a testing environment such as infrastructure 316 configured to run the cloud-resident test execution agent, with the testing environment at least partially hosted in the public cloud; or (ii) a downloadable test execution agent 358 configurable to run in the candidate cloud.

The example system also includes a validation service APIs 326 and supporting server(s) 330. Each server includes at least one processor 110 and a memory 112. The memory contains and is configured by engine software which upon execution (a) coordinates 636 performance of certification tests 338 using at least one test execution agent, (b) receives certification test results 322 generated by said performance, and (c) provides an analysis 324 of the certification test results.

In some embodiments when the VaaS system includes the downloadable test execution agent configurable to run in the candidate cloud, at least one of the following conditions is satisfied: the downloadable test execution agent is configured to communicate with the validation engine using outbound connectivity from the candidate cloud to the public cloud via the Internet; the downloadable test execution agent is fault-resilient (capable of recovery 638 after a fault 640 such as a kernel panic); the downloadable test execution agent is configured to automatically download 702 from the public cloud the most recent version of a certification test before executing that certification test.

In some embodiments, the VaaS system includes a validation service management store 320 and also includes a secure access token service 334 that limits access to the validation service store. The validation service store contains one or more of the following: uploaded 634 certification tests 338, resources (data, storage, servers, etc.) of the testing infrastructure 316, certification test results 322, or an analysis 324 of the certification test results. In some of these embodiments, the downloadable test execution agent includes code which upon execution obtains 704 a secure access token 332 from the secure access token service and utilizes 706 the secure access token to communicate directly with the validation service store to discover one or more certification tests to execute in the candidate cloud.

In some embodiments, at least one test execution agent 344 includes code which implements 708 a distributed mutex 346 to ensure that only a single certification test executes at a given time.

In some embodiments, the analysis 324 of the certification test results includes an analytics page 712 which is made 710 available to a cloud validation service operator 302 to download and view.

In some embodiments, the VaaS system is configured to run all 714 certification tests 338 using the VaaS-cloud-resident test execution agent and testing infrastructure 316.

Methods

Figure 4:
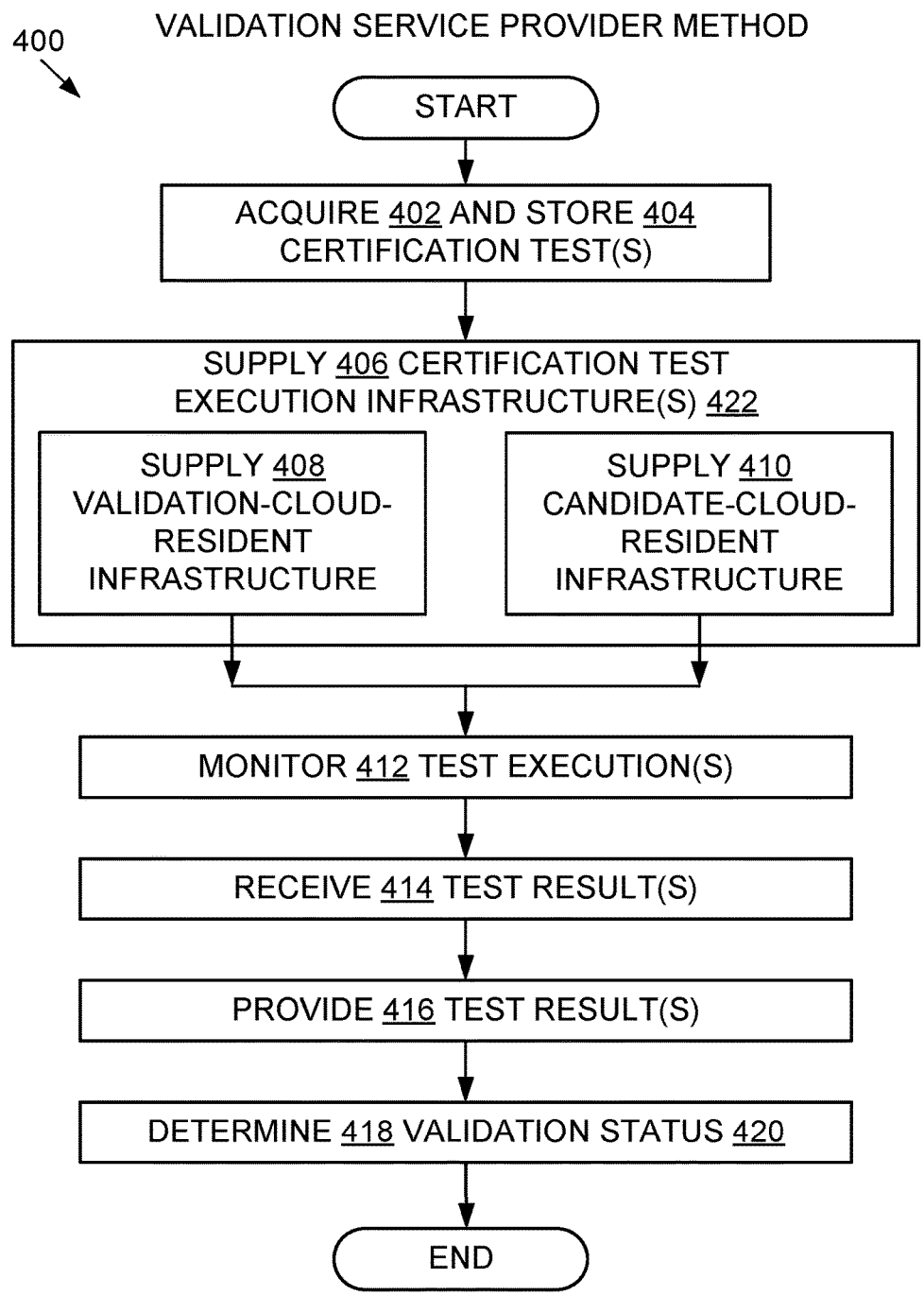
FIG. 4 is a flowchart illustrating aspects of a cloud validation service provider method.

FIG. 4 and other portions of the present disclosure illustrate validation service provider method 400 which is an example of methods supporting validation of a candidate cloud that may typically be performed by a validation service provider 336 or by the VaaS. This method includes one or more validation servers 330 outside the candidate cloud 350 acquiring 402 at least one digital certification test 338. Typically, the tests 338 are acquired 402, 602 from at least one source other than the validation service provider but in some situations one or more tests 338 are gotten 604 from the validation service provider. The method includes storing 404 acquired tests in a secured location in the VaaS cloud 314. Each acquired digital certification test 338 of interest here has an executable portion 340 which is capable, upon execution, of testing hardware 110, 112, 126, 352 that resides in the candidate cloud 350 or testing software 120, 122, 124, 352 that resides in the candidate cloud, or testing both hardware and software components 352. The example method also includes supplying 406 a certification test execution infrastructure 422 which is capable of executing one or more certification test executable portions 340. The example method also includes monitoring 412 at least one execution of at least one certification test executable portion, receiving 414 at least one certification test result which was generated by execution of one or more certification test executable portions, and providing 416 one or more certification test results for use in making a determination 418 whether to validate the candidate cloud or assign it some other status 420.

In some embodiments, supplying 406 a certification test execution infrastructure includes supplying 408 the certification test execution infrastructure in a cloud location which is outside the candidate cloud. In such cases, the certification test executable portion executes 606 in that cloud location outside the candidate cloud, and the certification test executable portion sends 610 requests 612 to endpoints 354 of the candidate cloud which are exposed over the internet.

In some embodiments, supplying 406 a certification test execution infrastructure includes furnishing 410 a downloadable test execution agent. In such cases, the certification test executable portion executes 608 in conjunction with execution of the test execution agent inside the candidate cloud 350. The test execution agent makes 618 only one or more outbound connections 620 from the candidate cloud to the one or more validation servers 330, thereby avoiding 614 reliance on having endpoints of the candidate cloud exposed over the internet.

In some embodiments, receiving 414 at least one certification test result includes receiving one or more results which individually or collectively specify a respective value or status for at least a predetermined number of the following tested items: throughput measured in input/output operations per second, throughput measured in megabytes per second, transactional throughput, streaming throughput, uptime, virtual machine redistribution impact, load rebalancing impact, patching impact, upgrade installation impact, hardware replacement impact, corrupt storage mitigation impact, power fluctuation impact, power loss impact, server hardware failure impact, concurrent virtual machine deployment impact, backup impact, backup restoration impact, node reboot impact, network interface failure impact, storage capacity threshold alert, virtual machine live migration, storage migration, compute node failure, storage node failure, non-shared disk failure, shared disk failure, network cable failure, network switch failure or error, router failure or error, firewall failure or error, host bus adapter failure. The predetermined number varies by embodiment, and may for example be any number from one through twenty-five.

In some embodiments, the validation server 330 also acquires 402, 604 at least one digital certification test from the validation service provider 336 itself. The digital certification test acquired 604 from the validation service provider has an executable portion 340 which is capable upon execution of testing hardware that resides in the candidate cloud or testing software that resides in the candidate cloud or testing both. In other words, the VaaS provider may contribute tests 338 in some embodiments, although it is expected that in other embodiments all tests 338 will be contributed by other entities.

In some embodiments, the validation server 330 also acquires 622 at least one non-required test 348. This test 348 may come, e.g., from at least one of the following: an integrated solution provider 310, a candidate cloud operator 304. This type of additional test 348, unlike certification tests 338, is not required for validation of the candidate cloud.

In some embodiments, the following steps are performed 624 automatically without human intervention: monitoring 412 at least one execution of at least one certification test executable portion, receiving 414 at least one certification test result which was generated by execution of one or more certification test executable portions, and providing 416 one or more certification test results for use in making a determination whether to validate the candidate cloud. More generally, a given embodiment may automatically and without human intervention perform 624 one or more of the enumerated steps of any method taught herein.

In some embodiments, at least one of the following conditions is satisfied: (i) the validation servers 330 respond 626 to requests from the candidate cloud but do not initiate 628 any traffic inbound to candidate cloud, or (ii) the candidate cloud does not expose 630 any communication endpoint 354 on the internet. In particular, some methods work 616 without the candidate cloud exposing any endpoints.

Figure 5:
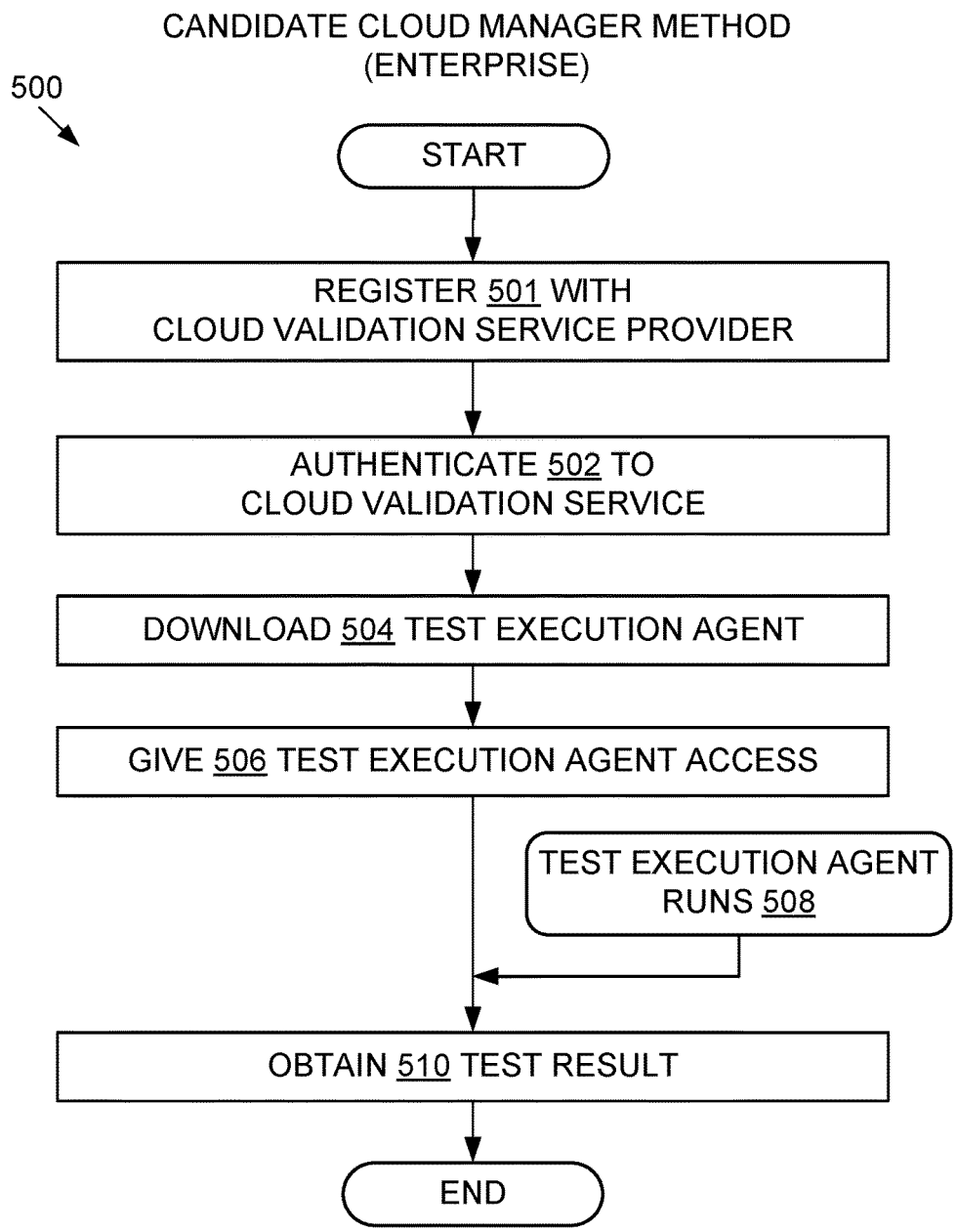
FIG. 5 is a flowchart illustrating aspects of a cloud manager method.

FIG. 5 and other portions of the present disclosure illustrate cloud validation service operator method 500 which is an example of methods supporting validation of a candidate cloud that may typically be performed by a cloud validation service operator 302 or by code within the candidate cloud 350. The illustrated method, which is suitable for enterprise operators, includes registering 501 with a validation service provider (registration is required to use the validation service); authenticating 502 to a validation service interface; downloading 504 via the validation service client interface 318 a test execution agent 358; and giving 506 the test execution agent access to run in the candidate cloud. Then the test execution agent runs 508, executing one or more certification tests 338. This step 508 is not necessarily part of a given embodiment, but even when it is not part of an embodiment the embodiment may include steps that use the result of step 508. Thus, the example method 500 includes obtaining 510 via the validation service interface a result 322 of a certification test after the test execution agent runs 508 in the candidate cloud and executes at least a portion of the certification test in the candidate cloud. A similar method suitable for hoster operators includes registering 501, authenticating 502, executing 508 tests directly on a cloud test execution infrastructure without downloading 504 an agent, and obtaining 510 test results.

In some embodiments, the method is performed by an integrated solution provider 310 in the role of the cloud validation service operator. In some of these, the test execution agent automatically downloads 504 certification tests, automatically executes in the candidate cloud executable portions of the downloaded certification tests, and automatically uploads results of the certification test executions to a validation service associated with the validation service client interface 318.

In some embodiments, the method is performed in the candidate cloud without accessing any candidate cloud endpoints from the internet.

In some embodiments, the candidate cloud is hosted 716 for an entity 306 by a hoster 308, the candidate cloud is located on a premises 208 of the hoster as opposed to being located and operated 718 on a premises 206 of the entity, and the method is performed by the hoster as the cloud validation service operator. In some of these embodiments, the hoster avoids 720 downloading any package 722 to the entity premises 206, and avoids 724 setting up 726 any test infrastructure on the entity premises.

Figure 6:
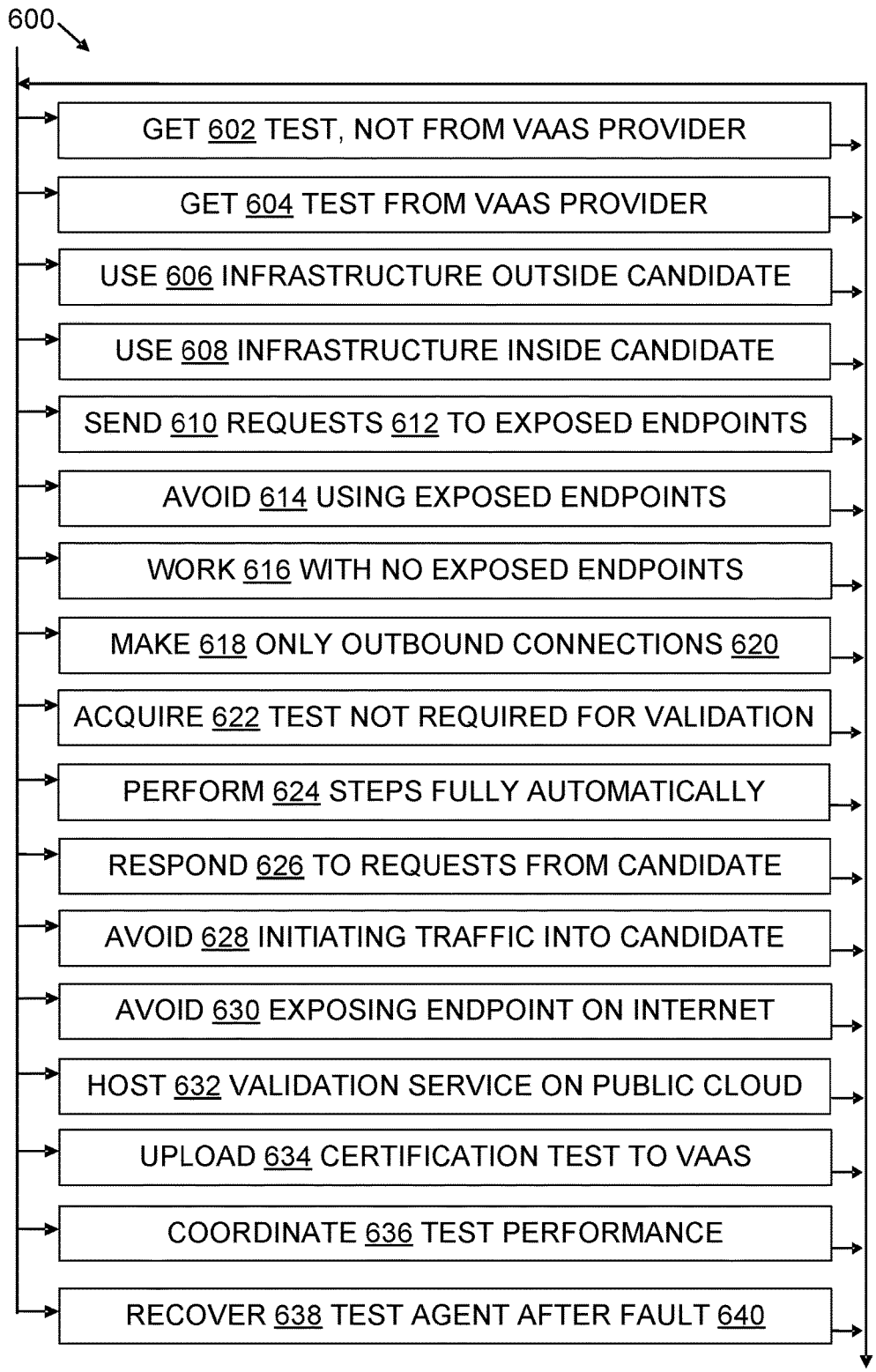
FIGS. 6 and 7 are flowcharts further illustrating steps in some cloud validation service methods.
Figure 7:
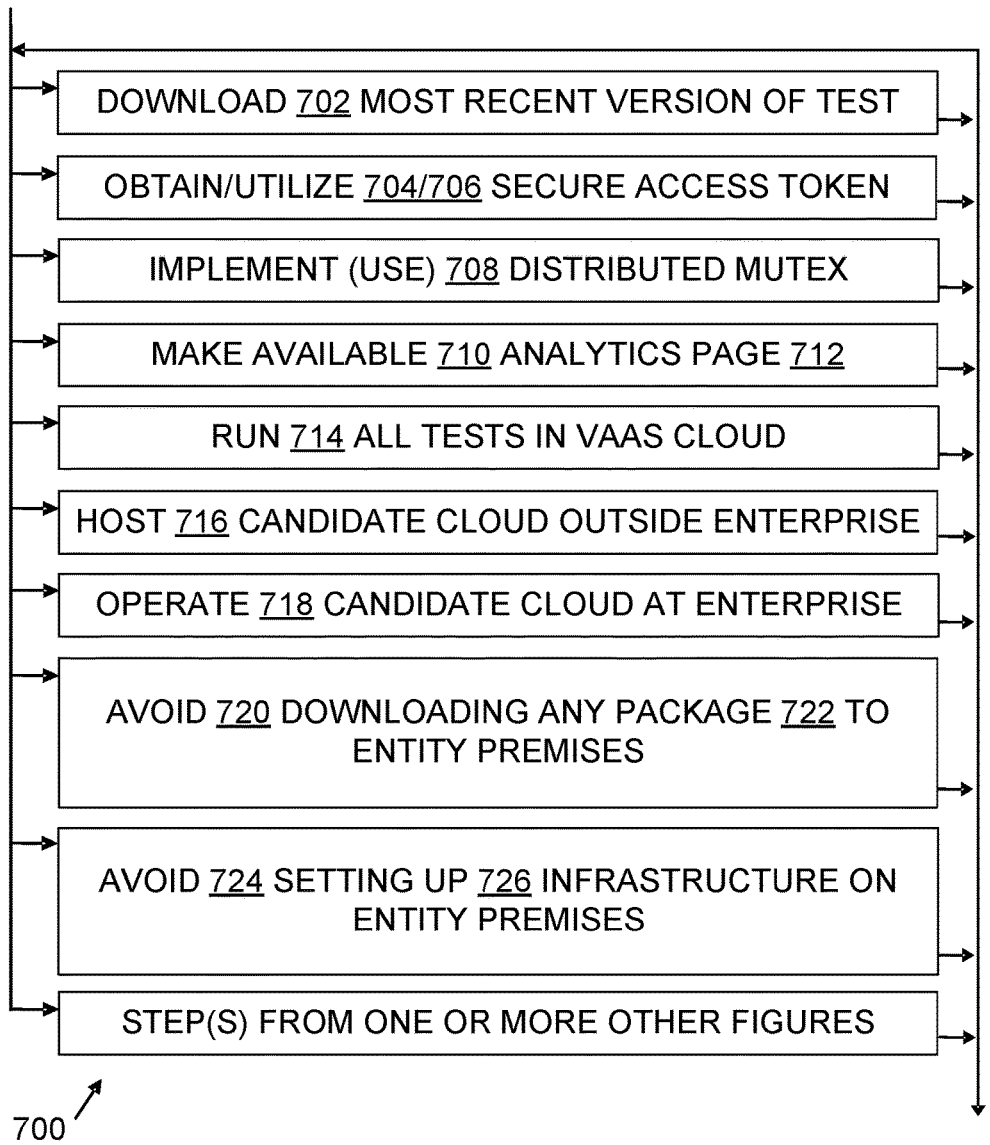

FIGS. 6 and 7 illustrate some method embodiments in general flowcharts 600 and 700. Technical methods shown in the Figures or otherwise disclosed will be performed automatically, e.g., by a validation API 326 and test execution agent 344, unless otherwise indicated. Methods may also be performed in part automatically and in part manually to the extent action by a human administrator or other human person is implicated, e.g., a component provider's developer may upload a certification test. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIGS. 6 and 7. Steps may be performed serially, in a partially overlapping manner, or fully in parallel. The order in which flowchart 600 or 700 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim. As noted in the Figures, steps from and of the methods may be combined in a given embodiment, including for example steps from one or more of FIG. 4, 5, 6, or 7. Likewise, although FIGS. 6 and 7 are provided on separate sheets to conform with applicable regulations, they are contiguous to one another with regard to method flows.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as certification test 338 executables 340, one or more test execution agents 344, a mutex such as distributed mutex 346, one or more validation service client interfaces 318, and an analysis 324, in the form of data 118 and instructions 116, read from a removable medium 114 and/or another source such as a network connection, to form a configured medium. The configured medium 112 is capable of causing a computer system to perform technical process steps for supporting validation testing of candidate networks as disclosed herein. The Figures thus help illustrate configured storage media embodiments and process embodiments, as well as system and process embodiments. In particular, any of the process steps illustrated in FIGS. 4-7 or otherwise taught herein, may be used to help configure a storage medium to form a configured medium embodiment.

Additional Considerations Regarding Outbound Connectivity

One challenge addressed herein is how to execute private cloud management tasks from an on-premises environment with only outbound internet connectivity, without creating code divergence or compromising security.

In a multi-tenant private cloud solution management service, hosted on a public cloud, there are often long running tasks that are scheduled by a web application interface to a backend service for asynchronous processing, in a typical service-oriented design. Some examples include validating and certifying a private cloud by executing tests, gatherer jobs such as collecting inventory of the solution, and executing a job such as a service health validator. Sometimes such tasks can be executed by the backend service running in the public cloud when the private cloud environment allows inbound connectivity from the internet. But where this is not possible, then these operations would execute from on-premises environments in which the operating assumption is that outbound connectivity is the only channel available.

One challenge when designing such solutions is keeping parity between the backend service code that executes tasks in the VaaS cloud versus the agent code that executes tasks on-premises. Too much divergence creates maintenance problems. Another challenge is ensuring that any agent running on-premises executing a task allows each specific tenant to manipulate or view data from its own tenant partition store from a multi-tenant store hosted in the cloud; otherwise there is a security issue. Another challenge is maintaining consistency in case only one task needs to execute at a given time. In a typical competing consumer pattern, for example, any thread from a thread pool can pick the task and start executing it.

To help address such challenges, the present disclosure describes approaches using on-premises agent with a custom SAS service that utilizes a storage queue. A web application or client drops tasks in the queue to execute, using a storage access token service. The storage access token service issues tokens for specific storage partitions. The approach uses optimistic concurrency provided by most storage solutions, for implementing a distributed mutex. These items can be used to create a light-weight on-premises execution agent.

One implementation includes a web portal 802 which the customer 104 uses to perform private cloud solution management tasks. Every task operation is sent as a request to a frontend 812 API service 318 which hosts the business logic. For any long running task (e.g., test execution), a work item is scheduled. This work item is then picked up by one of the backend 814 services and processed. In this example, these entire multi-tenant services are hosted on a public cloud and all tasks executed on a backend service assume connectivity to private cloud solution endpoints 354 from the internet. All resources are persisted on cloud storage by partitioning storage into tenant partitions.

In remaining discussion of this example, assume the work item is for executing a test. An issue arises when a private cloud solution does not have inbound internet connectivity but has only outbound. In such cases the backend service running from outside the private cloud 204 can no longer execute the test(s) for validation unless suitable mechanisms are provided. One approach is to manually download the test package that cannot execute from the public cloud, execute it manually in the private cloud, and then manually upload logs to the web portal after it completes. However, this breaks the end-to-end user experience, and also creates overhead by imposing manual steps involved in manual execution and manual upload which can be error prone and are a significant burden on administrative personnel. Also, care should be taken to not compromise security.

A better approach offers a seamless experience regardless of where the test executes. One such approach involves using storage queues 1010 to drop work items in, and using a SAS service 334 to request storage partition access tokens 332. When a test execution request is made from the web portal 802, the user is given an option to schedule this test in cloud (meaning in the VaaS cloud 314) or on-premises (meaning the premises containing the candidate cloud 350). Depending on what option is selected, the test execution work item is dropped in a respective queue. VaaS cloud execution uses a common (shared) queue which holds test execution work items from all tenants 1322. This queue is only processed by backend services running in the VaaS cloud. For on-premises executions, one implementation creates a dedicated queue using an identifier, e.g., a {tenantIdentifier-agentName} tuple. This queue is guaranteed to be unique across tenants. In cases where queue implementation restricts the number of characters, an appropriate hashing algorithm can be used.

In order to ensure that the on-premises agent 358 has access to storage services (queue, blobs etc.) for a specific tenant from where it is used, one embodiment implements a custom SAS service 334. The design assumes the availability of a storage service that supports issuing access tokens for a particular range within the storage. Microsoft Azure® provides one suitable technology, but teachings herein are not limited to Microsoft products or Microsoft services.

Upon starting the on-premises agent, the user is prompted to provide its credentials, which include the tenant identifier. The on-premises agent authenticates 502 the user with a token issuing authority and receives an authentication token. The agent then sends an outgoing request to the SAS service asking for access to a specific storage resource (and optionally a specific range). The SAS service validates the authentication token, extracts the tenant identifier for it and parses the resources the agent can access. It then creates an appropriate request for that specific tenant partition store and requests access tokens for that partition from the storage service. In the case of a queue resource, it automatically creates the queue using {tenantIdentifier-agentName} tuple where agent name is the name of the machine the agent is started on.

These storage access tokens are sent back to the agent (hosting the backend service code). The agent then dynamically initializes its storage abstraction layer with these storage access tokens and the remaining flow proceeds.

From a user's perspective, scheduling a test to the VaaS cloud or to an on-premises agent is completely the same experience. That is, the location of certification testing is transparent to the user, in these examples.

In some embodiments, multiple tests can be scheduled at the same time. Part of these can be scheduled against a VaaS cloud agent and part against an on-premises candidate-resident agent. In order to ensure only one test can execute at a given time a distributed mutex 346 is used. This design utilizes a storage service that supports optimistic concurrency where a single thread can perform a write to an entity at a specific time. The other thread(s) get back an exception which indicates the entity was updated.

An implementation leveraged this capability, by building a mutex object 346 which contains information such as owning test instance unique id (across entire storage) and expiration time. When a test executable portion 340 is picked for execution, the embodiment first retrieves a mutex entity from the storage and checks if it is already taken. If it is taken and the expiration time has not elapsed the embodiment postpones execution to a later time. If it is not taken or has expired, then the embodiment attempts to grab the mutex entity by writing its test instance id and expiration time to it. The optimistic concurrency offered by storage service ensures only a single write goes through. This approach allows the embodiment to efficiently handle cases where only one test needs to execute at a given time.

Some advantageous aspects of embodiments described herein include (a) facilitation for developing a multi-tenant private cloud management service hosted on a public cloud, (b) facilitation for developing a custom SAS service to which the on-premises agent connects for getting storage access tokens at runtime, (c) facilitation for developing a distributed mutex by leveraging the optimistic concurrency provided by a storage service, and (d) shortening the time required to validate cloud infrastructure and components as well as shortening the time to validate updates to a candidate. That is, approaches taught herein may be used with pre-production stage candidate clouds, or with production clouds that have been subject to an update or to recovery after a fault or even a disaster. Other advantageous aspects of embodiments will also be apparent to one of skill in the art in view of the present disclosure.

Additional Considerations Regarding Validation as a Service

Aspects of teachings herein have been embodied in one or more implementations using Microsoft Azure® Stack (mark of Microsoft Corporation) and used under a confidentiality agreement. To further illustrate alternatives, architectures, structures, APIs, and other aspects of the present teachings, additional details are provided below from product specifications, with the understanding that embodiments are not limited to the specific implementation details given, and that this level of detail is not necessarily required to describe what is claimed or to enable one of skill to make and use what is claimed.

Azure® Stack Validation as a Service (VaaS) is an end to end validation program that ensures Azure Stack Services deployed on top of hardware of a Solution, run functionally correct, are reliable, and are performant. The Solution, after meeting all the validation criteria, can then be published to the Azure Stack Solution Catalog ensuring customers that the system will run efficiently and stably in their datacenter. The VaaS service will provide partners (integrated systems) and solution builders with the necessary infrastructure to validate their solution, ensuring the end customers are successful when their solutions are deployed at their datacenters.

One Basic Validation Flow includes a Validation Tool Kit Run phase with Pass and Remediate operations, a Validation Passes phase with a Windows Server Catalog populated operation, and a Search Results phase with a Catalog displays solutions and their components operation. The VaaS will be scoped to how Microsoft (in this example) will enable customers to understand if their hardware is capable of running Microsoft Azure® Stack (MAS). When a solution is validated by VaaS, the customer knows their solution will work with MAS (or more generally, with whatever components of a candidate cloud are validated using VaaS).

Another Basic Validation Flow includes a Requirements and Tests phase, a Partner Execution phase, and a Result Submission & Certification phase. The Requirements and Tests phase includes characteristics such as Requirements & Certification tests made available on the web portal (no manual package download), Agile release cycle, and Tests can be updated without any download or impact. Next test execution will automatically pick the latest test package. The Partner Execution phase includes operations such as Setup on-premises agent, Partner kicks off tests from the web portal or shell, Agent automatically downloads latest test packages and executes tests, and Agent gathers all diagnostics data, logs and uploads to tenant cloud storage. The Result Submission & Certification phase includes characteristics such as the Validator (e.g., Microsoft) already knows the complete execution status of the partner lab, and has the relevant result files, logs, and operations such as the validator reviews the test result, its associated logs and certifies the hardware.

One VaaS application specific workflow includes a Solution Build step which leads to a Visit portal step which leads to a Choose solution decision which has three outcomes. One outcome includes Approve Solution, built on Submit Solution for Approval and Review Results. A second outcome includes Validate Solution, built on Run Tests and Review Results. A third outcome includes Review Solution Inventory.

Several Acquisition Scenarios may help illustrate aspects of embodiments. The example scenarios provided below include a DIY (do it yourself) scenario, Developer Evaluation, Customer Evaluation, and Partner Led Offerings. One of skill will recognize that the teachings herein are not limited to these examples.

DIY. A hosted solution provider wants to deploy Azure® Stack in their datacenter and provide an Azure consistent cloud and value added services to its customers. The hosted solution provider assigns an architect to investigate Azure Stack and come up with a solution that will meet business needs. The architect views the Microsoft Azure Stack webpage where they find a link to download architecture guidance for building private clouds. The architect reviews the documentation and decides on the set of Azure Stack features to implement for the business including hardware based features and Azure services. The hosted solution provider puts together a team to build the solution and begins to assemble the hardware they need by referencing the Microsoft hardware catalog and choosing from components that are tagged as being Azure Stack Ready. After acquiring and physically configuring the hardware the team uses the deployment tools available on the Microsoft GitHub site to install Azure Stack on the hardware. If the team encounters issues with deployment they are able to reference troubleshooting guides, the Deployment Community that develops the deployment tools, and call Microsoft product support for help. Once Azure Stack is running, the team will visit the Validation Portal 802 and run the validation tests 338. The Portal will confirm if they have built a robust private solution. If validation fails, the Validation Portal will provide details 324 about what failures occurred and how to remediate them. The team will then deploy workloads on the solution and use the Validation Portal to verify functionality. The team can then submit a validation report along with the necessary documents for approval and display in the Solutions Catalog. If approval fails, the Validation portal provides detailed information 324 about past reports and how to remediate.

Developer Evaluation (Software/One Box). A developer wants to begin prototyping an application on Azure Stack. The developer downloads a fully enabled image with the necessary documentation from MSDN. The developer mounts the image and is immediately up and running with an environment that simulates a relatively small 4-node Azure Stack deployment in software. If the developer has questions they can contact product support, refer to existing KB articles or leverage the Microsoft partner community to find answers.

Customer Evaluation (Hardware). A customer wants to deploy a solution in their datacenter that will enable them to evaluate a full hardware and software Azure Stack implementation. Their goal is to validate their applications, or specific workloads or their environment with Azure Stack. The customer visits a Microsoft web site or seeks information from their supplier who offers Azure Stack solutions and chooses a PoC that meets their needs. The customer engages with their supplier and purchases, leases or is loaned the hardware and software. The customer evaluates the PoC and can get support for the PoC from their supplier, or general support from Microsoft. Over the course of using the PoC the supplier will have also provided any necessary updates to the customer.

Partner Led Offerings. A customer decides to purchase a pre-configured and pre-integrated Azure Stack solution. The customer uses sizing tools available from Microsoft or their supplier to determine the configuration for the solution they need and they complete their purchasing process. The supplier delivers a solution that includes deployment services and completes the integration work to integrate the solution in the customer's datacenter and validates that the solution works. The customer deploys their workloads and uses the system. If the customer requires support, they are able to engage with their supplier and Microsoft. The preferred supplier will provide any necessary updates to the customer over the life-cycle of the solution.

Figure 8:
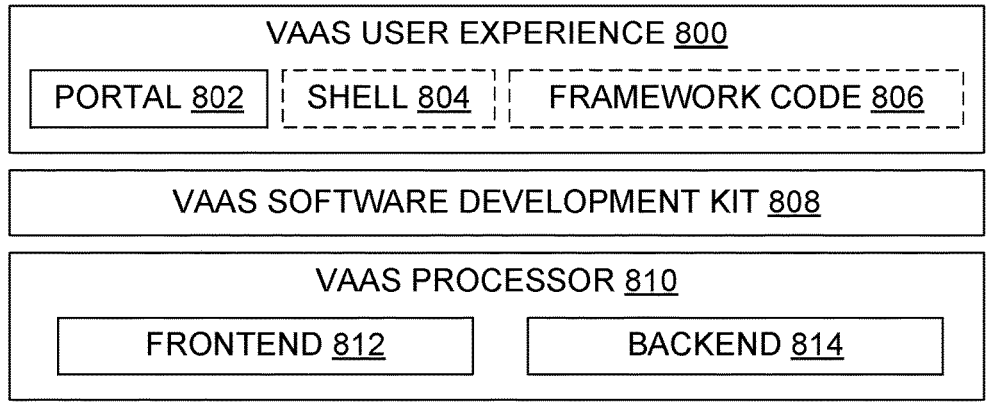
FIG. 8 is a block diagram illustrating aspects of a cloud validation service architecture.

FIG. 8 provides a high level overview of some embodiments. At a high level VaaS will include a User Experience (UX) 800 which will provide external callers with the ability to query VaaS for details or test execution support and a Processor 810 which will be driving the operations. VaaS UX 800 components will interact with the Processor 810 by invoking raw REST API calls, whereas PowerShell® code 804 or .NET™ code 806 can utilize an SDK 808 to interact in a more natural and convenient manner. The Processor will expose a REST endpoint for API calls and use roles from a token (generated by a trusted identity provider) for access control. The frontend 812 will serve synchronous API calls whereas the backend 814 will perform asynchronous task executions, at least one of which will be the actual execution of a test 338 or a test 348.

As to service layering, in this example different services will be hosted in different roles. This will support scaling them independently and managing them as a single unit. In this example, the VaaS processor 810 includes Synchronous REST Calls and Asynchronous Queue Work Pattern. Synchronous REST Calls provides a Tenant API 1310, e.g., management.vaas.com web role, for a VaaS FrontEnd Cloud Service. Asynchronous Queue Work Pattern provides a Test Controller 1102 in a worker role, an Azure storage queue, and Worker(s) in worker role, for a VaaS BackEnd Cloud Service. In addition to the VaaS processor, this example includes a Test Content Repository 902, e.g., testrepository.vaas.com web role, for a VaaS Test Management Service. Also in addition to the VaaS processor, this example includes a Storage Replicator in worker role and a Log Parser in worker role, for a VaaS Utility Service.

In this example, Portal and Test Store will be published as an Azure website/web apps. VaaS Processor will include frontend 812 and backend 814. Tenant API 1310 will be the front facing endpoint that will service all requests to managing the Solution and tests. For task processing, the service will simply create a task. Test controller will then queue the task to the worker. Test Management Service will be used for adding, removing, or updating test related content in this VaaS ecosystem. Storage Replicator will replicate data from tables 1312 to other regions and Log gatherer will parse logs 904 from log repository 906 and update them on the appropriate database.

Figure 9:
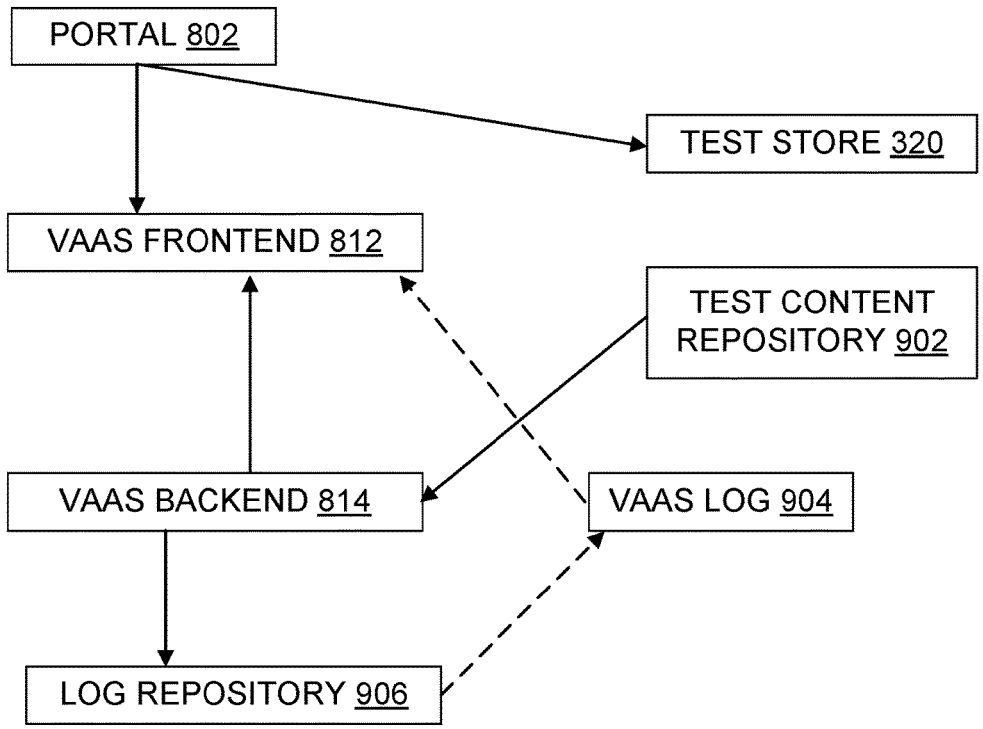
FIG. 9 is a diagram illustrating aspects of a cloud validation service data model.

FIG. 9 illustrates aspects of a data model for this example implementation. A portal 802 includes icons and a solution catalog in an Azure web app. A test store 320 includes test items in a SQL database of the Azure web app. The VaaS frontend 812 includes data for Task Definition, Registered Tenants, Solution, Project, Test Manifest, and a Reporting database. A test content repository 902 includes a test bin repository using, e.g., file share or blob mechanisms. The log repository 906 likewise uses file share or blob mechanisms to hold logs 904. VaaS replication (not shown) may also be present in a given implementation.

The various entities and their relationships are further described below, followed by a discussion of one approach for their persistent storage in a store.

| Registered Tenants | | |
|---|---|---|
| | Type | Description |
| Tenant Identifier* | Guid | Unique identifier for Tenant |
| Tenant Name | string | Registered Tenant user of VaaS |

Note that the Store for Registered Tenants may be managed by a different team. VaaS may simply query to find out tenant registration information.

| Solution | | |
|---|---|---|
| | Type | Description |
| Solution Identifier* | Guid | Unique identifier for Solution |
| Registered Tenant (FK) | Guid | The tenant under which solution belongs |
| Solution Name | string | Solution Name |
| Date Created | long | Date Created |
| Status | Enumeration | {Created, Failed} |

| Project | | |
|---|---|---|
| | Type | Description |
| Project Identifier* | Guid | Unique identifier for Project |
| Tenant Identifier (FK) | Guid | |
| Project Name | string | Project Name |
| Date Created | long | Date Created |
| Status | Enumeration | {Created, Failed} |

| Test Manifest | | |
|---|---|---|
| | Type | Description |
| Test Manifest Identifier* | Guid | Unique identifier for Test |
| Tenant Identifier (FK) | Guid | |
| Project Name | string | Project Name for this Test |
| Date Created | long | Date Created |
| Parameters | Dictionary | Parameters for the Test |
| Test Handler | Complex object | Test Handler information |
| Status | Enumeration | {Created, Scheduled, Running, Cancelled, Failed} |

Using Azure Table (XTable) for Storage

Azure Storage provides some in-built functionality, such as
  a) Storage space—one can utilize multiple storage accounts to persist data
  b) Computing resources—by utilizing appropriate strategy one can partition data across multiple partition servers
  c) Network bandwidth—same as above
  d) Un-schematized—flexibility of adding or updating properties In order to better manage horizontal scaling, with focus to improve performance and scalability, this example implementation divides the storage into shards. Each shard will have the same type of entities and data format but distinct entities. This will help organize data and by using a sharding key, data access will be routed to appropriate shard.

There are three types of sharding strategies
a) Lookup Strategy—Using pre-defined routes to route data access to a particular shard
b) Range Strategy—Groups related items by shard key
c) Hash Strategy—Using hashing to distribute data across shards Because the primary goal for this example implementation is to avoid any hotspots, hashing strategy works best for this case. To overcome the overhead of hash computation one can use a non-cryptographic hash function such as murmurhash.

This also implies that moving data over when a new shard (storage account) is added will carefully require copying over part of data from previous shard to new shard to avoid lookup failures.

This example implementation uses Tenant Id to partition tenant data into a shard bucket. The hash of tenant Id will be the bucket identifier and will also serve as Partition key for Azure table. For unique partition keys, Azure storage will spread them across different partition servers. These shard buckets will then be persisted in two or more storage accounts.

| Solution | | |
|---|---|---|
| | Type | Description |
| Tenant Identifier (Partition key) | Guid | Tenant under which solution belongs |
| Solution Identifier (Row key) | Guid | Solution identifier |

Because tenant id is used as partition key, different tenants will be scaled out to different nodes. From a single tenant perspective this does not provide any unique value as "Partition Query" will be used to retrieve a list of Solutions. Because this example does not anticipate a large number of solutions being created (e.g., there will be less than ten solutions in this example) this is acceptable.

Another approach uses split partitioning. Such an implementation would create N number of partitions for any Tenant and then spread solutions across them. A disadvantage of split partitioning is potential loss of group transaction support.

Figure 10:
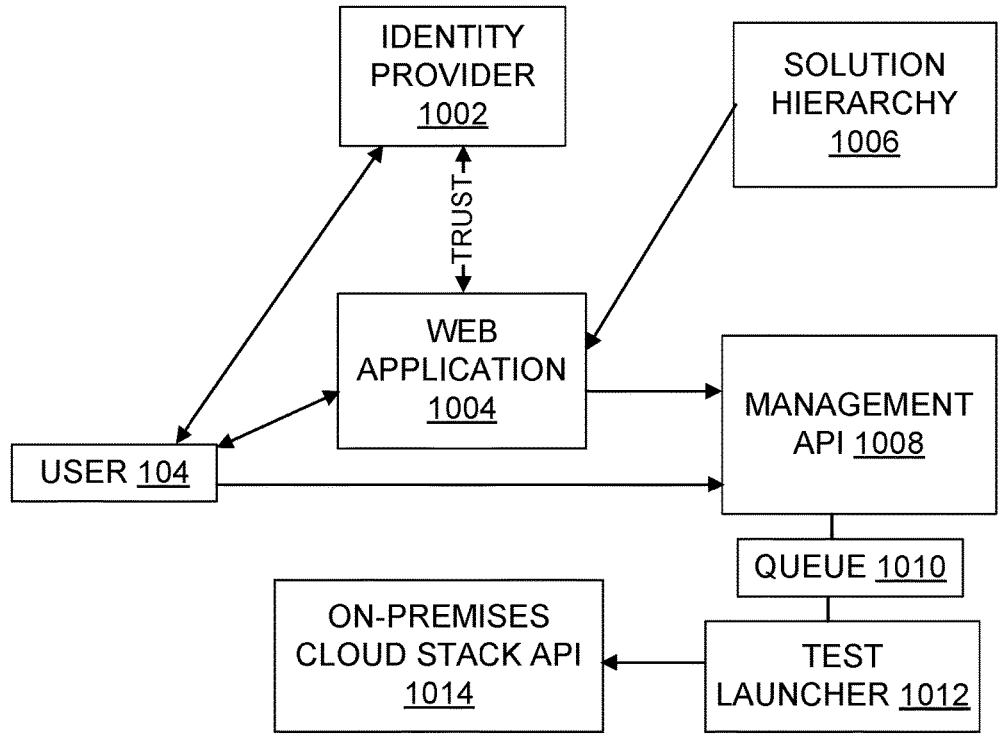
FIG. 10 is a diagram illustrating aspects of a cloud validation service authentication flow.

FIG. 10 illustrates aspects of an authentication flow in an example implementation. An identity provider 1002 has a trust relationship with a web application 1004. For example, in one implementation Azure® Active Directory® (marks of Microsoft Corporation) provides identity services to a web app in a virtual machine. A solution hierarchy 1006, icons, images, and the like are provided to the web app 1004 via SQL. A management REST API 1008 runs in a virtual machine, communicating via queue 1010 with a test launcher 1012 that runs in another virtual machine. Launched tests run (in this example) in an on-premises cloud stack using an Azure or other API 1014.

This example implementation provides token based authentication, with no identity management in the VaaS itself, and RBAC for operations. By way of context, Azure Stack supports two types of authentication mechanisms: a Cloud Connected mode where the MAS instance uses Azure AD for authentication and must support out-bound connectivity to ports 80 and 443, and a Cloud dis-connected mode where MAS instances use ADFS and local AD (the cloud can have outbound internet connectivity). For PoC deployment, it may be a requirement to use the first approach where MAS will use Azure AD. In this example, VaaS supports two types of execution modes. One mode is Full Online. In Full Online mode tests will be launched, executed and completed all from the VaaS Cloud 314. No test content will be downloaded on-premises to the candidate cloud 350. The other mode is Partial Online, in which tests 338 will be launched on one or more on-premises machines in the candidate cloud 350. In this example, Full Online mode requires MAS (or the other cloud stack involved) to be in a Cloud Connected mode and an inbound firewall rule setting to allow traffic from pre-defined IP addresses.

Additional details are provided below. As with other implementation details provided in this disclosure, these details are presented merely as further illustration without any assumption that they are necessary for a legally adequate written description, enablement, or other legal requirement.

Various Interactions.

VaaS Portal (thin client). One VaaS Portal is configured to use Azure AD as IDP. It will accept tokens only from Azure AD. Administrator consent is required to provision portal and VaaS services into the tenant directory from which the user is trying to access them.

VaaS Services. VaaS Backend services will accept tokens issued to Portal and specific VaaS Service. All services will enforce RBAC.

Partner/OEM. In order for a Partner or OEM to use the portal the following process is followed. Partner/OEM gets registered to use VaaS Services. Azure AD tenant directory from which users will be using VaaS Services is identified. Tenant directory administrator accesses VaaS Portal and consents. Roles are assigned to users for Services provisioned in their directory.

Partner/OEM <-> VaaS Portal flow. User learns about VaaS from a hosted home page. Once user selects log in, they will be re-directed to Azure AD for authenticating. User will provide Azure AD user credentials that they want to use for using VaaS Services. If this is the first time they are using VaaS then administrator consent is required. Once log-in is successful, VaaS Portal application and Services will be provisioned in their Azure AD directory. Administrator of the directory can then assign roles controlling which users can do what as to VaaS. Users can then perform operations on VaaS Portal.

VaaS UX <-> VaaS tenant management API flow. In this example, the Tenant Management API is an independent PaaS role, e.g., VaaS Management API, that will perform operations based on who the organization/tenant is. Since the user already authenticated to the VaaS Portal, the portal will use the user's access token as bootstrap token to make back-end calls. An alternative is to use Delegated Permissions to VaaS Management API when configuring Portal application in Azure. The access token can be extracted and the portal can simply forward the request to backend.

For automation purposes, a user can also execute VaaS tests from .NET client or PowerShell® or other shell. Instead of scheduling tests from Portal, Partner/OEM can perform the same task from a shell or from framework code using an SDK 808. To successfully perform these operations the following pre-requisites are met: (a) Provision a native client application in the Azure AD Directory being used. This allows use of delegated user credentials with non-interactive login. (b) Under permissions to other applications choose VaaS-Api from the list and give access to it. (c)

When acquiring token using ADAL, give the client ID of this application and user credentials. The user will already have been assigned a role.

VaaS Tests <-> Partner/OEM MAS instance. VaaS Tests, e.g., a client application, executes test operations against a candidate cloud endpoint instance deployed on customer site. The client application in this example will have owner permissions and a valid subscription to perform various resource related operations like creating VM, provisioning storage account, and so on. A subscription will be available with MAS deployment. A test may also take a user name and password to permit execution.

Backend Task Engine

Backend 814 will process messages queued by various services. It will initiate all registered dispatcher clients to process work. Dispatcher clients will contain the core logic for polling queue and executing task. Each dispatcher client in turn can initiate any number of worker threads to increase compute resource utilization. In some implementations, a dispatcher client will be started for each storage account specified in configuration file. Within that storage account it creates a Task Table (for task state) and a Tenant Task Queue (for polling work). The default dispatcher client executes a Task engine which performs tasks. Tasks are plugins that get executed by the engine and contain core logic to process the work item. The engine provides some features on its own that serve as a contract between engine and task plugin: Ensuring message is not stale, Retrying faulted or cancelled tasks, Cancelling tasks not completed in expected time, Re-processing failed tasks due to task engine shut down, Managing state from start to completion. The engine makes no assumptions about whether the message is idempotent or not. It is possible that if Task Engine crashed the same message is re-processed. The plugin makes an appropriate decision (mitigate or resolve) on how to handle such cases (e.g., with artificial idempotency). AN implementation may consider computational cost or data consistency risk vs. reliably figuring out if the message has been processed, and in some cases the safest thing to do is fail the task and have the client re-schedule it.

Figure 11:
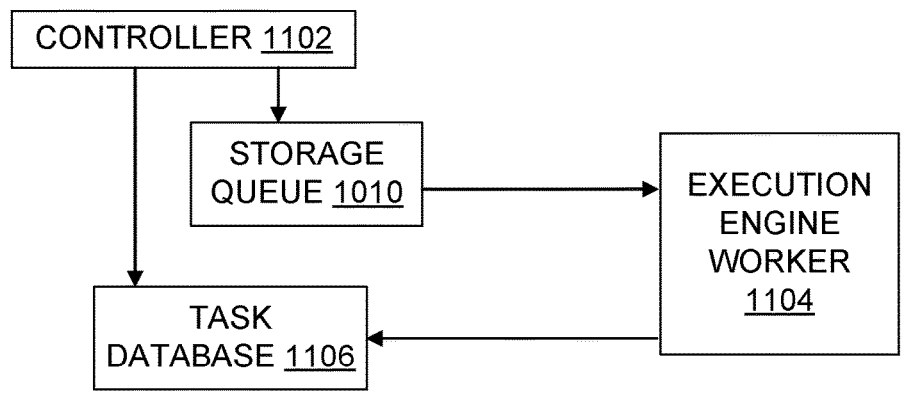
FIG. 11 is a diagram illustrating aspects of cloud validation service task scheduling.

As illustrated in FIG. 11, in some implementations, a task processing engine will include two modules, Task Scheduler (a.k.a. Controller) 1102 and Task execution engine worker 1104, both of which can be loaded into any executable. Each item 1102, 1104 runs in its own VM in this example. Task scheduler 1102 will schedule tasks based on scheduling policies while Task execution engine will process and execute them. Task scheduler will send messages to task queue 1010, which will be strongly typed message queues. This means a task of type A will be send to queue A to be processed while task of type B will be send to queue B to be processed. This way independent workers 1104 (with Task execution engine) can listen to the appropriate queue for work. When a user selects Test(s) for execution, some entity will create a Task in the Task store to execute. Test Scheduler service 1102 will scan the task table and schedule tasks to be processed by sending message to the task queue 1010. Worker role 1104 will pick the request and process it by using the task execution engine. After the processing is complete the engine will update the test state in a database 1106.

It may be possible for the queue to receive a message more than once. A message points to a unique test object so one may potentially have duplicate messages pointing to the same test object. In order to handle this, the Worker Role in this example will read and only update the state to Waiting-ToRun if initial state is Queued.

Task Execution Engine

In this example the task execution engine will process tasks as they arrive by queue. It will initiate and operate according to a state machine as task moves through different phases or processing. In order to support different ways of executing a task a simple plugin model will be utilized. All plugins will be registered with the task execution engine before it starts. When a task is created, the plugin type and optional argument will be specified. When task execution engine is about to execute the task it will simply create an instance of the plugin object and call the appropriate method.

Figure 12:
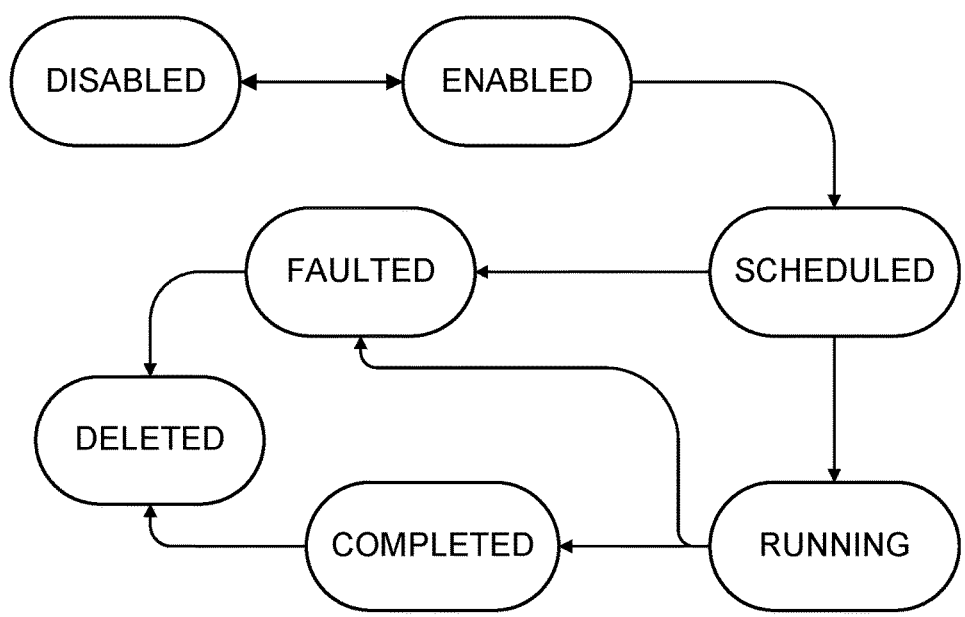
FIG. 12 is a diagram illustrating cloud validation service task execution states.

FIG. 12 illustrates the possible task states in this example. The state transitions are further described in the following table:

| State transitions table | | |
|---|---|---|
| Transition | Updated By Some Entity | Operation Created |
| 1 Enabled to Scheduled | Scheduler | After sending message to queue |
| 2 Scheduled -> Faulted | Task Engine | After maximum retries were done. Retry logic TBD |
| 2 Scheduled -> Running | Task Engine | Before loading plugin to process task |
| 3 Running -> Faulted | Task Engine | If anything while executing the task callback faulted |
| 3 Running -> Completed | Task Engine | Task was processed. TaskExecutionStatus will have final status |
| 4 Completed -> Deleted | Scheduler/ Task Engine | Based on retention policy |

Fault Handling

As to Fault Handling for Test Object, suitable assertions in this example include the following. Task Engine will process messages with state as Scheduled or Running only. For all other task states message will simply be ignored. Task Engine will own retry logic by re-scheduling tasks with execution status faulted. When re-scheduling a new message is send to avoid seven day message TTL (time to live) (seven is merely an example value). However, note that expected run time will not reset in this case. New expected time for the new message will be (Current Expected RunTime—Start Time) of task. Task Engine will enforce maximum allowed execution time for a task. Unless an unexpected shutdown does not occur, Task Engine will ensure task execution is completed. This is done by using Watch Dog timers at different levels.

Walkthrough of Possible Fault Scenarios

Task Engine will ensure all exceptions are handled and state is appropriately updated. Exception is only during fatal errors that cause machine to abruptly shut down.

Case 1# Scheduler picks a task to schedule (first state is updated then message sent). Before the state is updated to schedule if it crashes, it's a no-op and this implementation remains in enabled state. After the state is updated to schedule and before sending a message if it crashes then task will remain unprocessed. This can be mitigated by sending a message before scheduling and after scheduling. After the state is updated to "Scheduled" and message sent to queue, if it crashes then the harm done is little or none. Message has gone to queue and Task Engine will deal with it from that point on.

Cast 2# Task Engine De-queues message. Before updating the state to "Running", if Worker Role crashes, then the harm done is little or none. Default lease in this example is thirty seconds so message will re-appear again with state "Scheduled" and some other Task Engine instance will pick work. After updating the state to "Running" if it crashes then also the harm done is little or none since another instance of Task Engine picks the work. It is possible that the TaskCallback (core processing logic) had started the work previously in which case it is left to the callback itself to decide if it wants to resume or fault. This decision revolves around whether it is idempotent in nature or not.

Case 4# Task Engine finishes processing task. Before updating the state to "Completed/Faulted", if it crashes then another instance of Task Engine will pick the work and invoke TaskCallback. It is up to the callback to decide how to handle this. After updating the state to "Completed/Faulted" if it crashes then it's a no-op.

On-Premises Test Execution Agent

When running in the VaaS Cloud, the task engine has complete access to all Tenant space. Pushing this capability down to on-premises computing may create a security risk. In order to address this, some embodiments configure the connection logic made to storage backend to only scope access for a particular tenant. This can be done, for example, with SAS URLs. In some implementations, a tenant ID must be specified for any resource to which access is being requested. By cross checking tenant ID from a token with what is being sent, an implementation can quickly grant secure access to a particular tenant space only.

Figure 13:
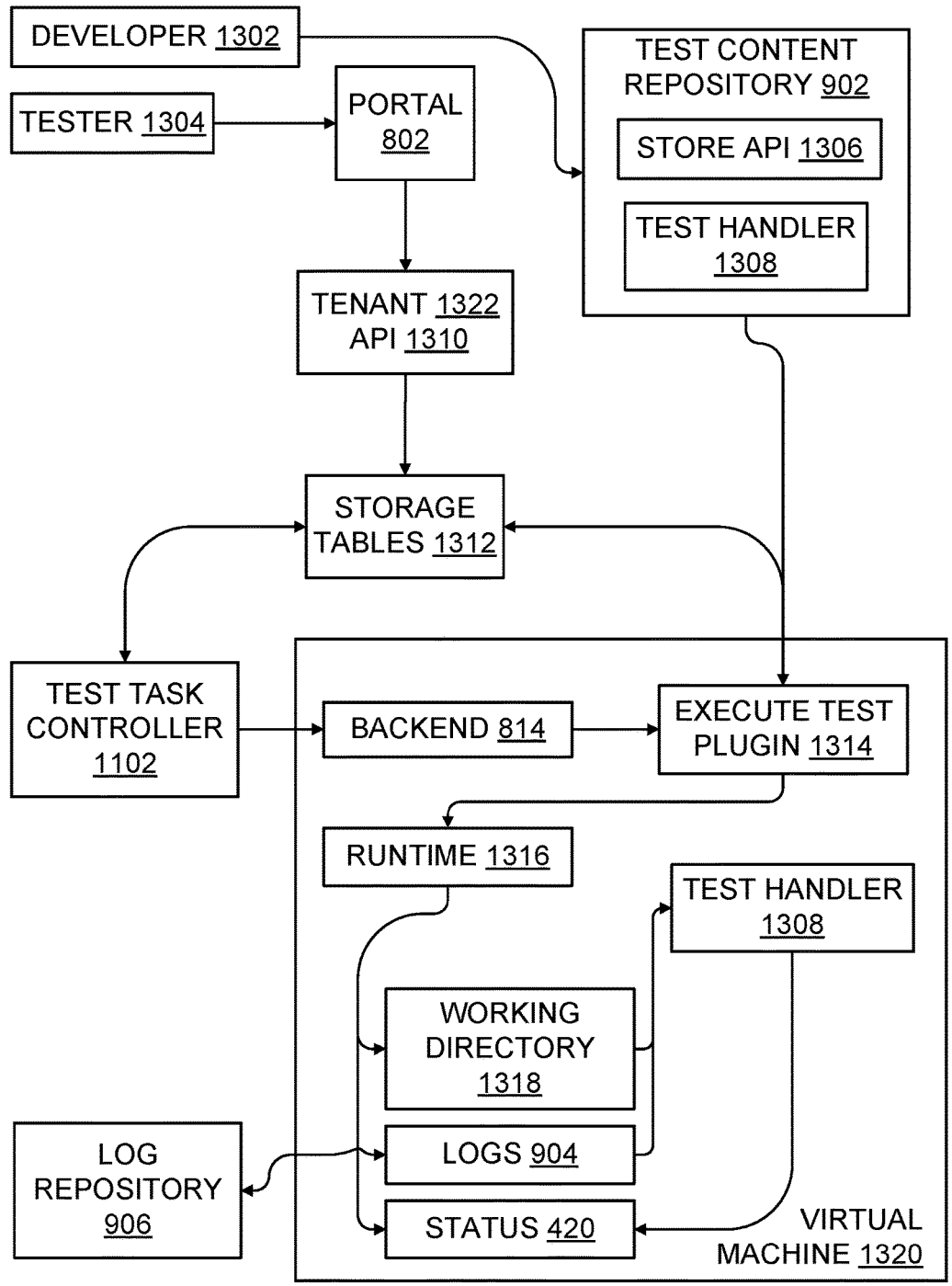
FIG. 13 is a diagram illustrating aspects of cloud validation service task handler management and execution.

FIG. 13 gives an overview of how test handlers will be managed and executed in VaaS in some embodiments. A test developer 1302 puts a new or revised test 338, 348 through an onboarding process. As part of this process, a binary compressed test is transferred to a repository 902 from the developer's storage. The repository 902 includes test handlers 1308 and a storage API 1306. Also as part of onboarding, a test item is added, via a test store API 326, to test store database. In some implementations, the test store API 326 may also be used to load tests to schedule into the portal. In some implementations, a test template file on a public URI is available to load test parameters and tasks into the portal 802.

In some embodiments, the test content repository test handler 1308 is copied into a VM 1320 that provides backend 814 functionality, and test execution infrastructure functionality such as a runtime 1316 and working directory 1318 for the test to run as a plugin 1314. Operation of the VM 132 is coordinated through the test handler 1308. In this example, the plugin 1314 decompresses the test and creates the runtime environment 1316. The test executes in the working directory 1318 and writes logs 904, under control or at the instigation of, the test handler 1308, which then updates the status 420. Storage tables 1312 are used to persist state for the testing on behalf of a given tenant.

In some implementations, Test Handlers will be launched by Worker Agent. Because the environment in which they will execute will be controlled and provisioned by worker agent, pre-defined runtime parameters will be created and the runtime file will specify these parameters. Handler can consume this file and retrieve values or user can supply them in execution command itself. In this example, Test Handlers are the engines driving the test execution, gathering logs and optionally transferring them to storage.

Sensitive data like user trade secrets, personally identifying information, secret or confidential information, and so on, is stored in encrypted form on the VM. All settings under protectedSettings will be encrypted using, e.g., an X509 certificate, before being sent over to VM 1320.

Additional Architecture Considerations

In some embodiments, validation as a service consists of or includes user experience, frontend and backend service layers. Prior to using the service, tenants are registered with VaaS by providing their tenant information. Administrators of that tenant then assign roles, which the service exposes.

User experience consists of or includes a tenant web portal and shell cmdlets or scripts. The tenant web portal provides a richer interface where certification requirements, test content, execution, monitoring, reporting and publishing all can be viewed and managed. PowerShell® cmdlets can be used to perform most operations in cases where automation is desired.

Frontend service, which consists of or includes several stateless web servers deployed as PaaS web roles, expose tenant APIs. These servers receive requests from either web portal or shell. While most of the processing is synchronous, any long running operation, like test execution, is queued to the backend worker for asynchronous execution.

Backend service provides an abstraction level for workers that perform any long running work, e.g., pulling work item, persisting, updating status, deferring, etc. This service uses queues to pull work items which include metadata and the type of the worker to process it. The service dynamically loads the target worker, provides it with the work item and manages its entire lifecycle. It is hosted either in VaaS cloud, e.g., as PaaS v1 Worker Roles, or on-premises as a stand-alone application (On-Premises Agent). To ensure the on-premises agent has access only to the tenant specific partition store to which the user belongs, SAS service or another authentication mechanism is used to request tokens authorized only for those partitions.

Test execution requests and work items are handled by the test execution worker. This worker automatically pulls the latest test content package from the test repository, hosted on blob storage or elsewhere, and executes it. Making updates to any test content package simply involves updating the repository, making the test delivery process efficient. The worker also collects diagnostics data (product logs, health alerts) on a periodic basis as a part of its extensions framework.

The Frontend routes the test execution request to the appropriate backend service based on the location selected by the user. When scheduled to execute in cloud, a competing consumers pattern is used where any available cloud backend service picks the request, from a shared queue, and starts executing. For on-premises scenarios, a dedicated queue is used using a {tenant, agent-name} tuple that is accessible only by that tenant only.

While the test executes, the test execution worker captures events raised by the test and streams it to VaaS Portal along with metrics and SLA calculation. This helps provide detailed insights into the current state of the system under test. Diagnostics data (product logs, performance counters) are also collected and ingested into analytics tools (e.g., Kusto) in parallel which can later be used to correlate any failure across the entire stack or do performance calculations.

For reporting, a separate dashboard (e.g., PowerBI® dashboard) is provided which visualizes the data stored by VaaS. The data is scrubbed and moved to a cold storage dedicated for reporting.

Alternative Role and Example Sets

The teachings provided herein are not limited to the particular set of role descriptions used as examples above. Rather, one of skill will receive and understand technical teachings from the present description which apply in a variety of circumstances that include a variety of role descriptions and examples. To further illustrate the teachings provided, two sets A and B of alternative role descriptions and examples are provided below. These may be combined across sets A and B, and roles and examples described above may also be combined with alternative roles and examples below from either set or both sets, in a given embodiment. In the event of apparent conflict between role descriptions or examples or both, the broadest operable understanding which is consistent with the present description applies.

Set A of role descriptions and examples follows.

Candidate Cloud.

This is the cloud 350 that will be tested using Certification Tests 338. It may be, for example, an on-premises private cloud located on the premises of an enterprise, or a hosted private cloud located in a datacenter under an agreement with an enterprise.

Cloud Component Provider.

Typically there are multiple Cloud Component Providers 356. They include hardware providers and software providers, and they may include one or more system integrators. They are responsible for providing or assembling the components of the Candidate Cloud. They may also provide some or all of the Certification Tests.

Certification Tests.

These are tests 338 which will be executed to determine whether the Candidate Cloud meets specified requirements. They may test performance, availability, throughput, security, scalability, resiliency, administrability, load balancing, and other cloud characteristics.

Certification Test Agent.

This software agent 344 obtains Certification Tests from the Validation Service Provider, executes them on the Candidate Cloud, and provides test results to the Validation Service Provider. The Certification Test Agent is provided by the Validation Service Provider, or by another entity in compliance with interface requirements provided by the Validation Service Provider.

Candidate Cloud Manager.

This role manages the Candidate Cloud. For a private cloud located on-premises at an enterprise, the Candidate Cloud Manager would often be the enterprise. For a cloud hosted at a datacenter, the Candidate Cloud Manager 312 would often be the hosting service provider.

Validation Service Provider.

This role gathers Certification Tests from Cloud Component Providers, makes the Certification Tests available to the Certification Test Agent, receives the test results, and provides the Candidate Cloud Manager with at least a summary of the test results. The Validation Service Provider 336 may also provide one or more of the Certification Tests.

Example Situation.

Consider an example situation with Microsoft and some fictional companies. Suppose Contoso Enterprises (Candidate Cloud Manager) wants to validate a private on-premises cloud (Candidate Cloud) running Humongous Insurance (Cloud Component Provider) database management code on top of Microsoft (Cloud Component Provider) Azure Stack code using server hardware from Fabrikam, Inc. (Cloud Component Provider). Contoso contracts with a Microsoft competitor, DatumBeast Corporation (Validation Service Provider), to provide cloud validation services. DatumBeast has a license from Microsoft to provide Validation as a Service (VaaS), using methods that are patented by Microsoft. So DatumBeast gathers Certification Tests from Humongous, Microsoft, and Fabrikam. DatumBeast also has its own proprietary Certification Test which tests how well the database software is integrated with Azure Stack. DatumBeast gives Contoso a Certification Test Agent, which Contoso loads on its private cloud. The Certification Test Agent downloads the Certification Tests, runs them, and uploads the results to DatumBeast's VaaS server. DatumBeast summarizes the test results, and reports them to Contoso.

The following additional examples, denoted A1 through A20, are provided to further illustrate teachings presented herein.

Example A1

A Validation Service Provider gathers Certification Tests from Cloud Component Providers, makes the Certification Tests available to the Certification Test Agent, receives the test results from the Certification Test Agent, and provides a summary of the test results.

Example A2

As in Example A1, wherein the Validation Service Provider also provides at least one of the Certification Tests.

Example A3

As in Example A1, wherein the Validation Service Provider also provides the Certification Test Agent for downloading into the Candidate Cloud.

Example A4

As in Example A1, wherein the Validation Service Provider replies to communications that come from the Candidate Cloud but the Validation Service Provider does not initiate any communication session with the Candidate Cloud.

Example A5

As in Example A1, wherein the method is performed without requiring use of a communication endpoint of the Candidate Cloud exposed on the internet.

Example A6

As in Example A5, wherein the Candidate Cloud does not expose any communication endpoint on the internet.

Example A7

As in Example A1, wherein the method is performed automatically without requiring human intervention after Certification Tests are gathered at least until the Validation Service Provider generates the summary of the test results.

Example A8

As in Example A1, wherein the Validation Service Provider receives test results pertaining to at least a specified number (e.g., one, two, three, four, five, and so on up to the number of listed items) of the following listed items: throughput measured in input/output operations per second, throughput measured in megabytes per second, transactional throughput, streaming throughput, uptime, virtual machine redistribution impact, load rebalancing impact, patching impact, upgrade installation impact, hardware replacement impact, corrupt storage mitigation impact, power fluctuation impact, power loss impact, server hardware failure impact, concurrent virtual machine deployment impact, backup impact, backup restoration impact, node reboot impact, network interface failure impact, storage capacity threshold alert, virtual machine live migration, storage migration, compute node failure, storage node failure, non-shared disk failure, shared disk failure, network cable failure, network switch failure or error, router failure or error, firewall failure or error, host bus adapter failure.

Example A9

A cloud validation system including (a) at least one Validation as a Service server, residing outside the Candidate Cloud and having a portal, and (b) at least one On-Cloud Certification Test Agent, which is a Certification Test Agent configured to reside inside the Candidate Cloud. The Validation as a Service server performs the method listed above in any of Examples A1-A8.

Example A10

As in Example A9, wherein the system also includes (c) a Cloud Simulation to simulate one or more aspects of the Candidate Cloud, and (d) an Off-Cloud Certification Test Agent, which is a Certification Test Agent configured to reside outside the Candidate Cloud and interact with the Cloud Simulation.

Example A11

As in Example A10, wherein the system also includes a distributed mutex which is used to ensure that only one Certification Test executes at a time in Candidate Cloud and Cloud Simulation.

Example A12

As in Example A9, wherein the Candidate Cloud is a private cloud owned by an enterprise and located on premises secured by the enterprise.

Example A13

As in Example A9, wherein the Candidate Cloud is a private cloud hosted by a cloud host provider on behalf of an enterprise, and is located off the enterprise's premises at a datacenter secured by the cloud host provider.

Example A14

As in Example A9, wherein the Candidate Cloud does not expose any communication endpoint on the internet.

Examples A15-A20 include methods performed by the Candidate Cloud Manager or by the on-premises agent on behalf of the Candidate Cloud Manager.

Example A15

A Candidate Cloud Manager obtains an On-Cloud Certification Test Agent from a Validation Service Provider, and configures the On-Cloud Certification Test Agent to run in a private Candidate Cloud, then the On-Cloud Certification Test Agent automatically downloads Certification Tests, executes them, and uploads test results to the Validation Service Provider.

Example A16

As in Example A15, wherein the Candidate Cloud Manager configures the On-Cloud Certification Test Agent from a web portal of the Validation Service Provider, or from a shell.

Example A17

As in Example A15, wherein the On-Cloud Certification Test Agent allows or prevents execution of a Certification Test based on a distributed mutex which is used to ensure that only one Certification Test executes at a time in the Candidate Cloud and a Cloud Simulation.

Example A18

As in Example A15, wherein the method is performed in a private Candidate Cloud which supports only outbound internet access.

Example A19

As in Example A15, wherein the On-Cloud Certification Test Agent requests a download of a particular Certification Test, executes the Certification Test, the Candidate Cloud Manager makes a configuration change in the Candidate Cloud, then the On-Cloud Certification Test Agent in response to the configuration change or passage of time or another trigger again requests download of the Certification Test, the On-Cloud Certification Test Agent downloads an updated version of the Certification Test, and the On-Cloud Certification Test Agent executes the updated version of the Certification Test. Example A19 illustrates one way in which tests get automatically updated so the agent will use the latest version of the test(s).

Example A20

As in Example A15, wherein the On-Cloud Certification Test Agent downloads from the Validation Service Provider and executes in the Candidate Cloud at least three Certification Tests from at least three different Cloud Component Providers that are sources of components of the Candidate Cloud.

Set B of role descriptions and examples follows.

Candidate Cloud.

This is the cloud 350 that will be validated and certified using certification tests before getting deployed to an on-premise datacenter. Once deployed, it can then be used in two scenarios: (i) by enterprises as a private or hybrid cloud made accessible only through the enterprise network, or (ii) by service providers (e.g. Hosters) which deploy cloud services and offer them to external customers (Tenants) for IaaS, PaaS or SaaS offerings.

Cloud Component Provider.

Typically there are multiple Cloud Component Providers 356. They include hardware providers (e.g. Network, Storage Disks vendors) and software providers (e.g., Microsoft).

Candidate Cloud Operator.

This role manages the Candidate Cloud. For a private cloud located on-premises at an enterprise, the Candidate Cloud Operator 304 would often be the enterprise. For a cloud hosted at a datacenter and exposed to external customers the Candidate Cloud Operator would often be the service provider (e.g., Hoster).

Integrated Solution Provider:

These are OEM's that use components from Cloud Component Providers and integrate them on their hardware. These integrated solutions are then brought to marked and sold to Candidate Cloud Operators.

Certification Tests.

These are tests 338 which will be executed to validate and certify the Candidate Cloud. They can test reliability, performance, availability, throughput, security, scalability, resiliency, administrability, load balancing, and other cloud characteristics.

Validation Service Provider.

This role implements business processes enabling Cloud Validation Service Operators to certify various components of the Candidate Cloud. Users access this service via a web portal which presents these business processes as workflows. Each workflow guides the user to certifying a specific component of the Candidate Cloud. The workflow presents the requirements for certification, lists of tests to get executed and continuous test execution monitoring once tests have been or are being executed.

Cloud Validation Service Operator.

This role manages the Validation Service tasks. They interact with Validation Service Provider(s) 336 to execute certification tests. They can either be (i) an Integrated Solution Provider that will validate and certify that the integrated solution can run the cloud while meeting tenant SLAs before bringing them to the market, or (ii) Service Providers (e.g., Candidate Cloud Operator) that validate the new Candidate Cloud services offered to customers work as expected when deployed on the integrated solution.

Test Execution Agent.

Certification tests can be executed either on cloud or on-premises. The former is used by Service Providers where the cloud endpoints are exposed over the internet. The latter is used by Integrated Solution Providers in cases where the cloud endpoints are accessible only from on-premises. Test Execution Agent 344 is the component responsible for executing the tests, persisting state and uploading results at the end of execution. Downloadable agent 358, 344 automatically downloads the Certification Test packages and executes them against the cloud 350.

Situation.

Consider an example situation with Microsoft and some fictional companies. Suppose Contoso OEM wants to sell their integrated solution to customers, e.g., to Candidate Cloud Operators. The solution is built using components from Cloud Component Providers. For the software component they use Microsoft's Azure Stack™ cloud software. For hardware they can either use their own or from other IHVs or both. Contoso OEM has contracted with Microsoft to get their integrated solution certified before bringing it out to the market. They understand that certifying their solution will ensure that the hosted cloud services offered by Microsoft will run reliably and functionally correct on their hardware stack. Microsoft will then provide them a license for Cloud Validation as a Service (VaaS) which will be used for certification, using methods that are patented by Microsoft. Contoso can then access the Validation Service to start the integrated solution certification workflow, download their test execution agent and execute the workflow. As a part of workflow execution, the test execution agent will download certification tests on-premises, execute them against their solution, validate and upload the test results. Once completed they request certification sign off from Microsoft. The certified integrated solution is then brought to the market.

As another example, DatumBeast is a service provider which offers IaaS and PaaS offerings to its customers. They purchase the certified integrated solution from Contoso to provide more services to end users; they also host services from one or more third parties. Before making these services available to their customers they want to ensure that they run functionally correct. DatumBeast applies for a license for using Cloud Validation service. They then execute the cloud service validation workflow which validates the service being deployed. The validation tests execute from a public cloud against their cloud endpoints. DatumBeast doesn't have to install or configure anything software on-premises. Once test execution results have succeeded, they are sure that the service works as expected and is safe to offer to their customers.

Example B1

A Validation Service provider provides a workflow model that enables Cloud Validation Service Operators to validate and certify aspects of the Cloud. It gathers certification requirements including tests, provides execution infrastructure, monitors test execution, gathers results and provides detailed summary. For scenarios where tests are to execute from on-premises, it also provides a downloadable Test Execution Agent.

Example B2

As in Example B1, wherein the Validation Service Provider also provides at least one of the Certification Tests.

Example B3

As in Example B1, wherein the Validation Service Provider provides a test execution infrastructure in the VaaS cloud. Tests can execute directly from the VaaS cloud sending requests to Candidate Cloud endpoints exposed over the internet.

Example B4

As in Example B1, where the Validation Service Providers provides a downloadable test execution agent package. The Test Execution Agent executes tests from on-premises making only outbound connection to the Validation Service. Candidate Cloud endpoints don't have to be exposed over the internet.

Example B5

As in Example B4, wherein the Validation Service Provider does not initiate any inbound traffic to Candidate Cloud. It simply responds to requests made to it.

Example B6

As in Example B4, wherein the Candidate Cloud does not expose any communication endpoint on the internet.

Example B7

As in Examples B3 and B4, wherein the method is performed automatically without requiring human intervention. Certification Test packages are downloaded, executed and results uploaded. Validation Service Provider generates the summary of the test results.

Example B8

As in Example B1, wherein the Validation Service Provider receives test results pertaining to at least a specified number of the following: throughput measured in input/output operations per second, throughput measured in megabytes per second, transactional throughput, streaming throughput, uptime, virtual machine redistribution impact, load rebalancing impact, patching impact, upgrade installation impact, hardware replacement impact, corrupt storage mitigation impact, power fluctuation impact, power loss impact, server hardware failure impact, concurrent virtual machine deployment impact, backup impact, backup restoration impact, node reboot impact, network interface failure impact, storage capacity threshold alert, virtual machine live migration, storage migration, compute node failure, storage node failure, non-shared disk failure, shared disk failure, network cable failure, network switch failure or error, router failure or error, firewall failure or error, host bus adapter failure.

Example B9

A cloud validation solution including (a) a multi-tenant validation service web API hosted on public cloud outside the Candidate Cloud, (b) at least one interface such as a Portal to interact with the Service API, (c) Test Execution Agent and infrastructure hosted in the VaaS cloud that can be leveraged if the Candidate Cloud allows in-bound access, (d) Test Execution Agent downloadable package for use in cases where test execution must happen from on-premises, (e) API support to add new certification tests into the ecosystem, (f) a public store for test packages, (g) a store for persisting resources, and (h) an analysis engine for analyzing results.

Example B10

As in Example B9, wherein the validation solution also provides a downloadable Test Execution Agent that can be used to execute tests from on-premises and communicates with service using out-bound connectivity to internet. The Agent is resilient to faults (e.g., test machine unexpected shutdown) and ensures the test reaches a terminal state.

Example B11

As in Example B10, and the validation service implements a secure access token service that grants limited store access, e.g., authorized access only for the cloud validation service operator authenticated for that access. The service can leverage any public cloud storage SAS tokens functionality for this (e.g. Azure Storage SAS).

Example B12

As in Example B10, and the downloaded Test Execution Agent leverages the validation service secure access token API to request tokens for the store partition accessible by the current Cloud Validation Service Operator. It then bypasses the service API and directly talks to the store to discover tests to be executed. It also uses the store for persisting state and uploading results.

Example B13

As in Example B9, and the Test Execution Agent implements a distributed mutex to ensure only a single test executes at a given time. This distributed mutex is built on top of any storage optimistic concurrency model which allows only a single update operation to go through. Before a test executes, it grabs the mutex by performing a write operation containing metadata to count the test instance and other properties. The service ensures that the mutex is released before the max lock timeout specified in the mutex property.

Example B14

As in Example B9, and the validation service provides an analytics page for Cloud Validation Service Operators to be able to download and view results and also perform analysis of their test execution(s).

Example B15

Integrated Solution Provider obtains license and uses Validation Service Provider. It then accesses Validation Service Provider web portal, downloads Test Execution Agent on-premises, and configures the Candidate Cloud to be accessible by the Test Execution Agent.

Example B16

As in Example B15, wherein the Integrated Solution Provider then selects the certification workflow and executes it. It can do so using any interface (Portal or PowerShell® for example). PowerShell is a mark of Microsoft Corporation. Test Execution Agent will automatically download packages, execute and upload results.

Example B17

As in Example B15, wherein the method is performed from an on-premise environment that supports only out-bound internet access. The Candidate Cloud endpoints hence are only accessible from on-premises.

Example B18

The Service Provider (Hoster) obtains a license using Validation Service Provider. It can then access Validation Service Provider and choose the certification workflow to execute.

Example B19

As in Example B18, the service provider (Hoster) does not have to download any package or setup any test infrastructure on-premises. It has a Candidate Cloud already setup that is accessible over the internet.

Example B20

As in Example B18, all tests execute from a cloud.

Example B21

As in Examples B16 and B20, and the Test Execution Agent uses a distributed mutex to ensure only one test executes at a given time if multiple tests get scheduled for execution at the same time.

Example B22

As in Examples B16 and B20, wherein the Test Execution Agent automatically downloads the tests to execute from cloud storage. If a change is made to any of the test, the Test Execution Agent will ensure it is automatically picked up in the next execution.

Example B23

As in Example B9, and the validation service allows Cloud Validation Service Operators to add their own tests into the ecosystem. These tests can then be made visible only for the operator that added them or for the public. These tests will not necessarily be used for certification requirements.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 4-7 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method supporting validation of a candidate cloud, the method suitable to be performed by or on behalf of a validation service provider, comprising:

one or more validation servers outside the candidate cloud acquiring from at least one source other than the validation service provider, and storing in a secured location, at least one digital certification test, each digital certification test having an executable portion which is capable, upon execution, of testing hardware that resides in the candidate cloud or testing software that resides in the candidate cloud or testing both;

supplying a certification test execution infrastructure which is capable of executing one or more certification test executable portions;

monitoring at least one execution of at least one certification test executable portion;

receiving at least one certification test result which was generated by execution of one or more certification test executable portions, wherein receiving at least one certification test result comprises receiving one or more results which individually or collectively specify a respective value or status for at least four of the following tested items: throughput measured in input/output operations per second, throughput measured in megabytes per second, transactional throughput, streaming throughput, uptime, virtual machine redistribution impact, load rebalancing impact, patching impact, upgrade installation impact, hardware replacement impact, corrupt storage mitigation impact, power fluctuation impact, power loss impact, server hardware failure impact, concurrent virtual machine deployment impact, backup impact, backup restoration impact, node reboot impact, network interface failure impact, storage capacity threshold alert, virtual machine live migration, storage migration, compute node failure, storage node failure, non-shared disk failure, shared disk failure, network cable failure, network switch failure or error, router failure or error, firewall failure or error, host bus adapter failure; and providing one or more certification test results for use in making a determination whether to validate the candidate cloud.

2. The method of claim 1, wherein supplying a certification test execution infrastructure comprises supplying the certification test execution infrastructure in a cloud location which is outside the candidate cloud, wherein the certification test executable portion executes in said cloud location outside the candidate cloud, and the certification test executable portion sends requests to endpoints of the candidate cloud which are exposed over the internet.

3. The method of claim 1, wherein supplying a certification test execution infrastructure comprises furnishing a downloadable test execution agent, wherein the certification test executable portion executes in conjunction with execution of the test execution agent inside the candidate cloud, and the test execution agent makes only one or more outbound connections from the candidate cloud to the one or more validation servers, thereby avoiding reliance on having endpoints of the candidate cloud exposed over the internet.

4. The method of claim 1, wherein the validation server also acquires at least one digital certification test from the validation service provider, said digital certification test from the validation service provider having an executable portion which is capable upon execution of testing hardware that resides in the candidate cloud or testing software that resides in the candidate cloud or testing both.

5. The method of claim 1, wherein the validation server also acquires at least one test from at least one of the following: an integrated solution provider, a candidate cloud operator, and wherein said test is not required for validation of the candidate cloud.

6. The method of claim 1, wherein the following steps are performed automatically without human intervention: monitoring at least one execution of at least one certification test executable portion, receiving at least one certification test result which was generated by execution of one or more certification test executable portions, and providing one or more certification test results for use in making a determination whether to validate the candidate cloud.

7. The method of claim 1, wherein
the validation servers respond to requests from the candidate cloud but do not initiate any traffic inbound to candidate cloud.

8. A system supporting validation testing of a candidate cloud, the system comprising:
a validation service interface hosted on a public cloud outside the candidate cloud, the validation service interface including a test upload interface for uploading certification tests;
at least one of the following certification test execution infrastructures:
a cloud-resident test execution agent and a testing environment configured to run the cloud-resident test execution agent, the testing environment at least partially hosted in the public cloud;
a downloadable test execution agent configurable to run in the candidate cloud;
and
a validation server which includes at least one processor and a memory, the memory containing and configured by software which upon execution (a) coordinates performance of certification tests using at least one test execution agent, (b) receives certification test results generated by said performance, and (c) provides an analysis of the certification test results.

9. The system of claim 8, wherein the system includes the downloadable test execution agent configurable to run in the candidate cloud, and at least one of the following conditions is satisfied:
the downloadable test execution agent is configured to communicate with the validation server using outbound connectivity from the candidate cloud to the public cloud via the internet;
the downloadable test execution agent is fault-resilient;
the downloadable test execution agent is configured to automatically download from the public cloud the most recent version of a certification test before executing that certification test.

10. The system of claim 8, wherein the system includes a validation service store and also includes a secure access token service that limits access to the validation service store, the validation service store containing one or more of the following: uploaded certification tests, resources of the testing environment, certification test results, analysis of the certification test results.

11. The system of claim 10, wherein the downloadable test execution agent includes code which upon execution obtains a secure access token from the secure access token service and utilizes the secure access token to communicate directly with the validation service store to discover one or more certification tests to execute in the candidate cloud.

12. The system of claim 8, wherein at least one test execution agent includes code which implements a distributed mutex to ensure only a single certification test executes at a given time.

13. The system of claim 8, wherein the analysis of the certification test results includes an analytics page which is available to a cloud validation service operator to download and view.

14. The system of claim 8, wherein the system is configured to run all certification tests using the cloud-resident test execution agent and testing environment.

15. A method supporting validation of a candidate cloud, the method suitable to be performed by or on behalf of a cloud validation service operator, the method comprising:
   authenticating to a validation service interface;
   downloading via the validation service interface a test execution agent;
   giving the test execution agent access to run in the candidate cloud; and
   obtaining via the validation service interface a result of a certification test after the test execution agent runs in the candidate cloud and executes at least a portion of the certification test in the candidate cloud.

16. The method of claim 15, wherein the method is performed by an integrated solution provider as the cloud validation service operator, and wherein the test execution agent automatically downloads certification tests, automatically executes in the candidate cloud executable portions of the downloaded certification tests, and automatically uploads results of the certification test executions to a validation service associated with the validation service interface.

17. The method of claim 15, wherein the method is performed in the candidate cloud without accessing any candidate cloud endpoints from the internet.

18. The method of claim 15, wherein the candidate cloud is hosted for an entity by a hoster, the candidate cloud is located on a premises of the hoster as opposed to being located on a premises of the entity, and the method is performed by the hoster as the cloud validation service operator.

19. The method of claim 18, wherein the hoster avoids downloading any package to the entity premises, and avoids setting up any test infrastructure on the entity premises.

20. The method of claim 1, wherein the candidate cloud does not expose any communication endpoint on the internet.

* * * * *